(12) United States Patent
Rahman et al.

(10) Patent No.: US 12,119,904 B2
(45) Date of Patent: Oct. 15, 2024

(54) METHOD AND APPARATUS FOR CODEBOOK BASED UL TRANSMISSION

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/930,583

(22) Filed: Sep. 8, 2022

(65) Prior Publication Data

US 2023/0148388 A1    May 11, 2023

Related U.S. Application Data

(60) Provisional application No. 63/246,598, filed on Sep. 21, 2021, provisional application No. 63/404,078, filed on Sep. 6, 2022.

(51) Int. Cl.
*H04B 7/0456*   (2017.01)
*H04B 7/06*     (2006.01)

(52) U.S. Cl.
CPC ......... *H04B 7/0469* (2013.01); *H04B 7/0628* (2013.01)

(58) Field of Classification Search
CPC .. H04B 7/0456; H04B 7/0469; H04B 7/0617; H04B 7/0619; H04B 7/0628; H04B 7/0636; H04B 7/0639; H04B 7/0404; H04L 5/0044; H04L 5/0091
See application file for complete search history.

(56) References Cited

U.S. PATENT DOCUMENTS

| | | | |
|---|---|---|---|
| 2018/0183503 A1 | 6/2018 | Rahman | |
| 2020/0059276 A1* | 2/2020 | Monir Vaghefi | ..... H04B 7/0456 |
| 2020/0287602 A1 | 9/2020 | Park | |
| 2020/0413433 A1* | 12/2020 | Jiang | ..... H04L 1/0072 |
| 2021/0227472 A1 | 7/2021 | Liu | |
| 2021/0359805 A1* | 11/2021 | Petersson | ..... H04B 7/0456 |

FOREIGN PATENT DOCUMENTS

WO    2021169819 A1    9/2021

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.

(Continued)

*Primary Examiner* — Betsy Deppe

(57) ABSTRACT

Methods and apparatuses for codebook based UL transmission are provided. A method for operating a UE comprises transmitting a UE capability information about a UL codebook for 8 antenna ports; receiving an indication indicating a TPMI for a transmission of a PUSCH; and transmitting the PUSCH based on the indicated TPMI, wherein the TPMI indicates a precoding matrix from the UL codebook for the 8 antenna ports, the UL codebook includes full-coherent (FC) precoding matrices comprising all non-zero entries, and an l-th column of a FC precoding matrix is associated with an l-th layer of the PUSCH transmission.

20 Claims, 10 Drawing Sheets

(56) References Cited

OTHER PUBLICATIONS

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.
"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.
"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321 V17.0.0, Mar. 2022, 146 pages.
"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331 V17.0.0, Mar. 2022, 1119 pages.
"3rd Generation Partnership Project; Technical Specification Group Radio Access Network; NR; Physical channels and modulation (Release 17)", 3GPP TS 38.211 V17.0.0, Dec. 2021, 134 pages.
"3rd Generation Partnership Project; Technical Specification Group Radio Access Network; NR; Multiplexing and channel coding (Release 17)", 3GPP TS 38.212 V17.0.0, Dec. 2021, 190 pages.
"3rd Generation Partnership Project; Technical Specification Group Radio Access Network; NR; Physical layer procedures for control (Release 17)", 3GPP TS 38.213 V17.0.0, Dec. 2021, 225 pages.
"3rd Generation Partnership Project; Technical Specification Group Radio Access Network; NR; Physical layer for procedures for data (Release 17)", 3GPP TS 38.214 V17.0.0, Dec. 2021, 217 pages.
"3rd Generation Partnership Project; Technical Specification Group Radio Access Network; NR; Physical layer measurements (Release 17)", 3GPP TS 38.215 V17.0.0, Dec. 2021, 26 pages.
"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.
"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.
International Search Report and Written Opinion dated Dec. 28, 2022 regarding International Application No. PCT/KR2022/014128, 9 pages.
Catt, "On UL enhancements in Rel-18", 3GPP TSG RAN Meeting #93-e, RP-212257, Sep. 2021, 4 pages.

* cited by examiner

METHOD AND APPARATUS FOR CODEBOOK BASED UL TRANSMISSION

CROSS-REFERENCE TO RELATED APPLICATIONS AND CLAIM OF PRIORITY

The present application claims priority to U.S. Provisional Patent Application No. 63/246,598, filed on Sep. 21, 2021, and U.S. Provisional Patent Application No. 63/404,078, filed on Sep. 6, 2022. The content of the above-identified patent documents is incorporated herein by reference.

TECHNICAL FIELD

The present disclosure relates generally to wireless communication systems and more specifically to a method and apparatus for codebook based uplink transmission.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE. Likewise, in order to correctly estimate the UL channel conditions, the UE may transmit reference signal, e.g., SRS, to the gNB for UL channel measurement. With this UL channel measurement, the gNB is able to select appropriate communication parameters to efficiently and effectively perform wireless data communication with the UE in the UL.

SUMMARY

Embodiments of the present disclosure provide methods and apparatuses for codebook based uplink transmission.

In one embodiment, a UE in a wireless communication system is provided. The UE includes a processor, and a transceiver operably coupled to the processor, the transceiver configured to: transmit a UE capability information about an uplink (UL) codebook for 8 antenna ports; receive an indication indicating a transmit precoding matrix indicator (TPMI) for a transmission of a physical uplink shared channel (PUSCH); and transmit the PUSCH based on the indicated TPMI, wherein the TPMI indicates a precoding matrix from the UL codebook for the 8 antenna ports, the UL codebook includes full-coherent (FC) precoding matrices comprising all non-zero entries, and an l-th column of a FC precoding matrix is associated with an l-th layer of the PUSCH transmission, and is given by $$W_{l,m,n}^{(l)} = \frac{1}{s}\begin{bmatrix} v_{l,m} \\ \varphi_n v_{l,m} \end{bmatrix},$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T,$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases},$$

$$\varphi_n = e^{j\pi n/2},$$

wherein: $l \in \{1, \ldots, v\}$ and v is a number of layers of the PUSCH transmission, $N_1$ and $N_2$ are number of antenna ports with the same polarization in first and second dimensions, respectively, $O_1$ and $O_2$ are oversampling factors in the first and second dimensions, respectively, and S is a scaling factor.

In another embodiment, a BS in a wireless communication system is provided. The BS includes a processor configured to generate an indication indicating a TPMI for a transmission of a PUSCH. The BS includes a transceiver operably coupled to the processor, the transceiver configured to receive a user equipment (UE) capability information about an uplink (UL) codebook for 8 antenna ports; transmit the indication indicating the TPMI for the transmission of the PUSCH; and receive the PUSCH based on the indicated TPMI, wherein the TPMI indicates a precoding matrix from the UL codebook for the 8 antenna ports, the UL codebook includes FC precoding matrices comprising all non-zero entries, and an l-th column of a FC precoding matrix is associated with an l-th layer of the PUSCH transmission, and is given by $$W_{l,m,n}^{(l)} = \frac{1}{s}\begin{bmatrix} v_{l,m} \\ \varphi_n v_{l,m} \end{bmatrix},$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T,$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases},$$

$$\varphi_n = e^{j\pi n/2},$$

wherein: $l \in \{1, \ldots, v\}$ and v is a number of layers of the PUSCH transmission, $N_1$ and $N_2$ are number of antenna ports with the same polarization in first and second dimensions, respectively, $O_1$ and $O_2$ are oversampling factors in the first and second dimensions, respectively, and S is a scaling factor.

In yet another embodiment, a method for operating a UE is provided. The method comprises: transmitting a UE capability information about a UL codebook for 8 antenna ports; receiving an indication indicating a TPMI for a transmission of a PUSCH; and transmitting the PUSCH based on the indicated TPMI, wherein the TPMI indicates a precoding matrix from the UL codebook for the 8 antenna ports, the UL codebook includes FC precoding matrices comprising all non-zero entries, and an l-th column of a FC precoding matrix is associated with an l-th layer of the PUSCH transmission, and is given by $$W_{l,m,n}^{(l)} = \frac{1}{s}\begin{bmatrix} v_{l,m} \\ \varphi_n v_{l,m} \end{bmatrix},$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T,$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases},$$

$$\varphi_n = e^{j\pi n/2},$$

wherein: $l \in \{1, \ldots, v\}$ and v is a number of layers of the PUSCH transmission, $N_1$ and $N_2$ are number of antenna ports with the same polarization in first and second dimensions, respectively, $O_1$ and $O_2$ are oversampling factors in the first and second dimensions, respectively, and S is a scaling factor.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
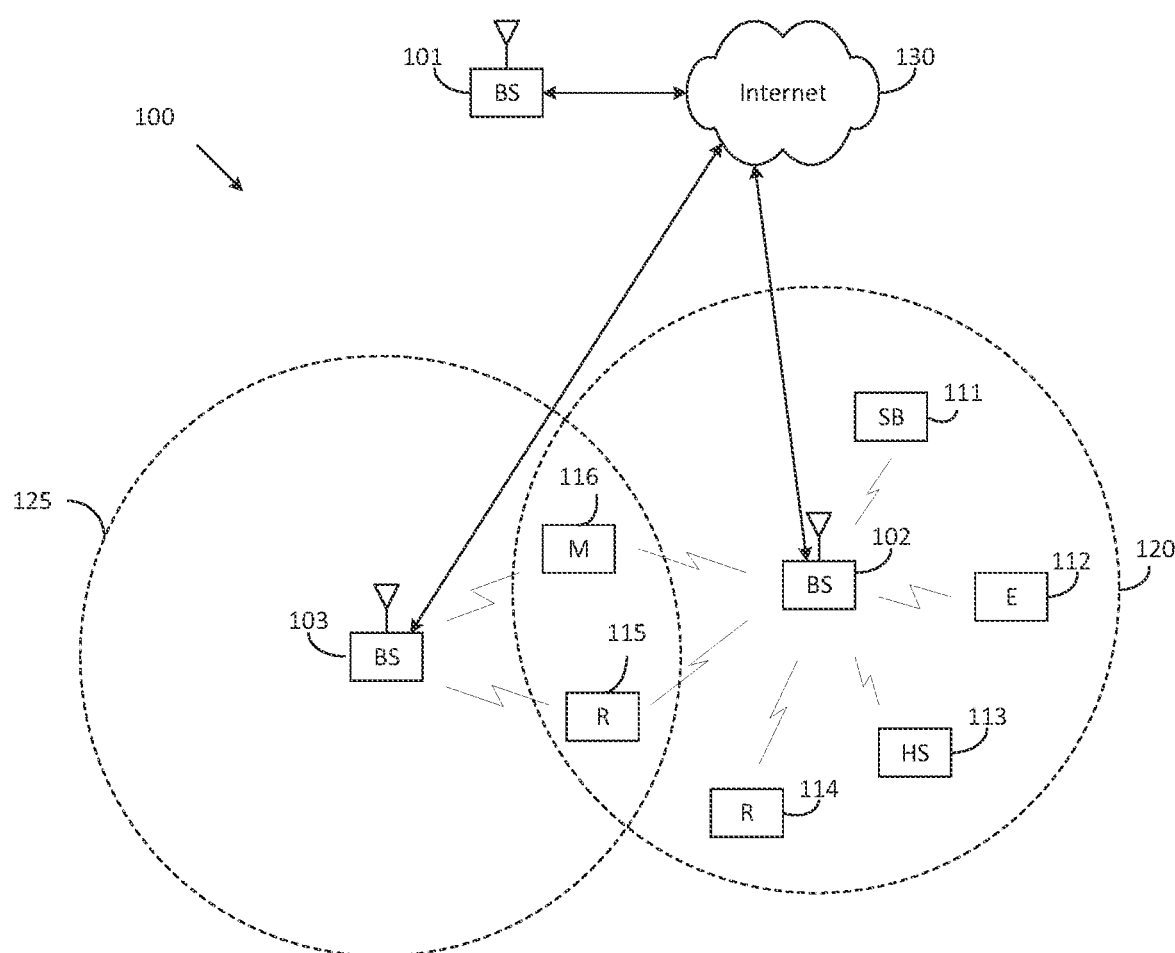
FIG. 1 illustrates an example wireless network according to embodiments of the present disclosure.

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TS 38.211 v17.0.0, "NR, Physical channels and modulation" (herein "REF 6"); 3GPP TS 38.212 v17.0.0, "E-UTRA, NR, Multiplexing and channel coding" (herein "REF 7"); 3GPP TS 38.213 v17.0.0, "NR, Physical Layer Procedures for Control" (herein "REF 8"); 3GPP TS 38.214 v17.0.0; "NR, Physical Layer Procedures for Data" (herein "REF 9"); 3GPP TS 38.215 v17.0.0, "NR, Physical Layer Measurements" (herein "REF 10"); 3GPP TS 38.321 v17.0.0, "NR, Medium Access Control (MAC) protocol specification" (herein "REF 11"); 3GPP TS 38.331 v17.0.0, and "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates or in lower frequency bands, such as below 6 GHz, to enable robust coverage and mobility support. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
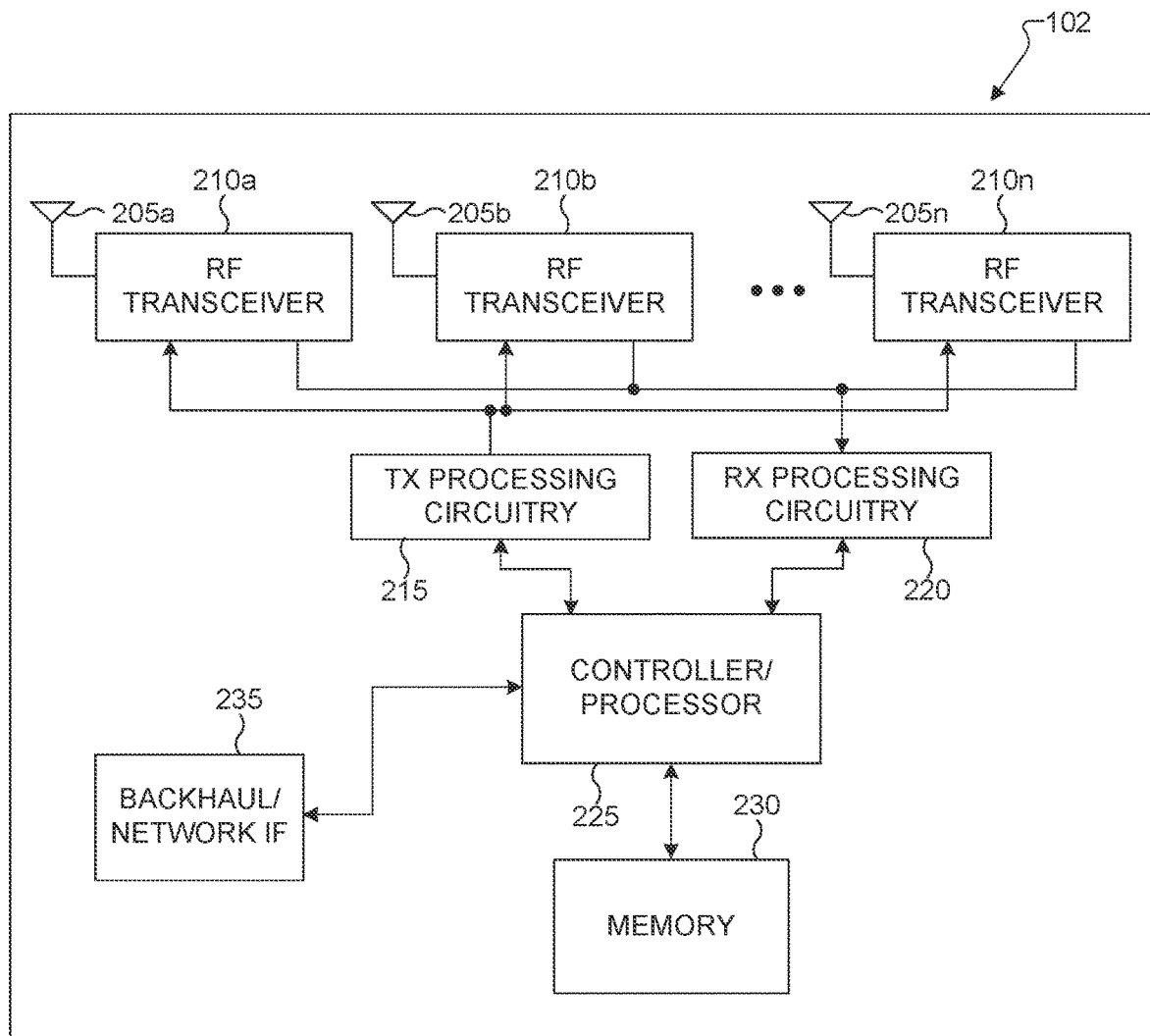
FIG. 2 illustrates an example gNB according to embodiments of the present disclosure.
Figure 3:
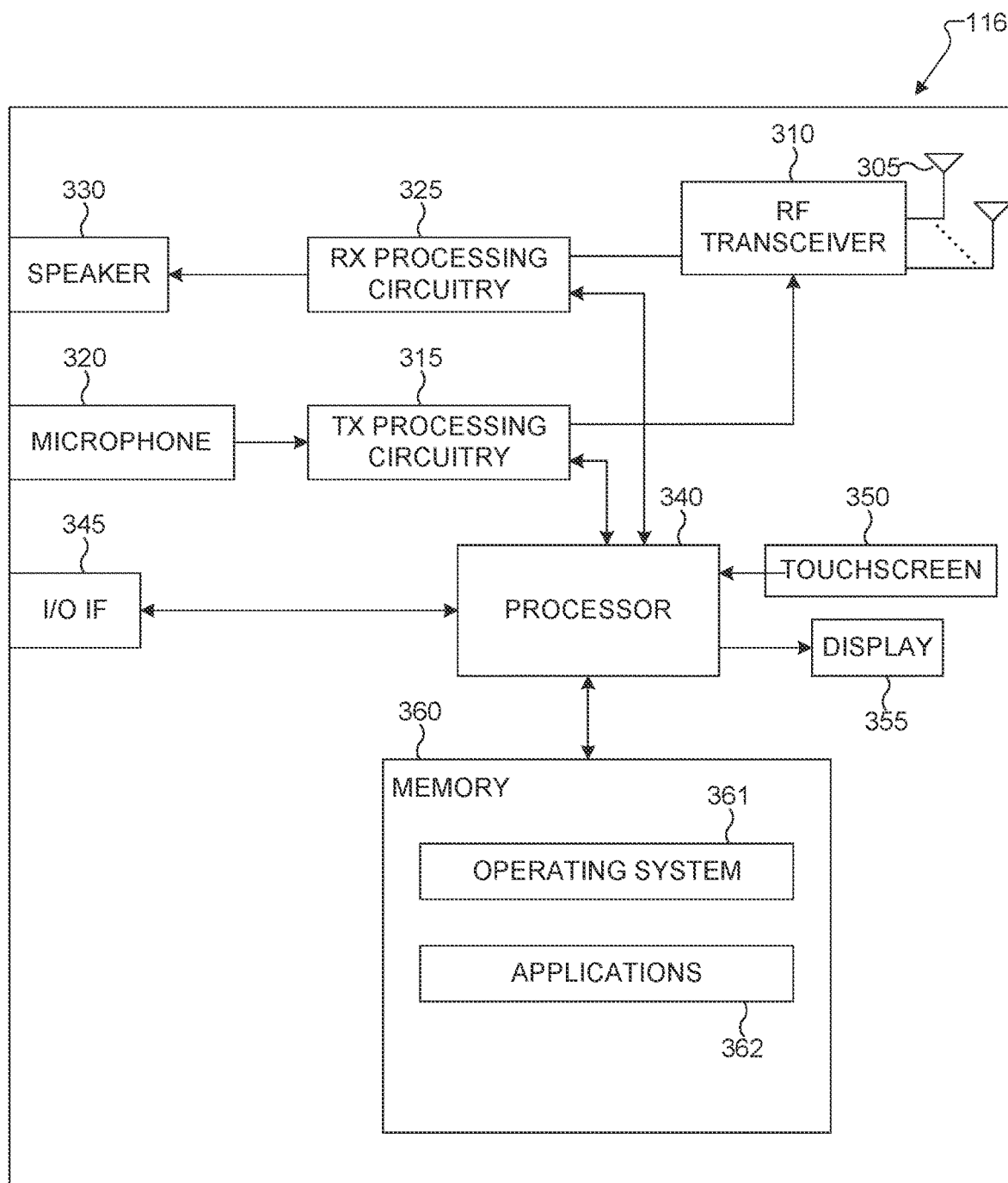
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for transmitting a UE capability information about an uplink (UL) codebook for 8 antenna ports; receiving an indication indicating a transmit precoding matrix indicator (TPMI) for a transmission of a physical uplink shared channel (PUSCH); and transmitting the PUSCH based on the indicated TPMI, wherein the TPMI indicates a precoding matrix from the UL codebook for the 8 antenna ports, the UL codebook includes full-coherent (FC) precoding matrices comprising all non-zero entries, and an l-th column of a FC precoding matrix is associated with an l-th layer of the PUSCH transmission, and is given by $$W_{l,m,n}^{(l)} = \frac{1}{s}\begin{bmatrix} v_{l,m} \\ \varphi_n v_{l,m} \end{bmatrix},$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T,$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases},$$

$$\varphi_n = e^{j\pi n/2},$$

wherein: $l \in \{1, \ldots, v\}$ and v is a number of layers of the PUSCH transmission, $N_1$ and $N_2$ are number of antenna ports with the same polarization in first and second dimensions, respectively, $O_1$ and $O_2$ are oversampling factors in the first and second dimensions, respectively, and S is a scaling factor. One or more of the gNBs 101-103 includes circuitry, programing, or a combination thereof, for generating an indication indicating a transmit precoding matrix indicator (TPMI) for a transmission of a physical uplink shared channel (PUSCH); receiving a user equipment (UE) capability information about an uplink (UL) codebook for 8 antenna ports; transmitting the indication indicating the TPMI for the transmission of the PUSCH; and receiving the PUSCH based on the indicated TPMI, wherein the TPMI indicates a precoding matrix from the UL codebook for the 8 antenna ports, the UL codebook includes full-coherent (FC) precoding matrices comprising all non-zero entries, and an l-th column of a FC precoding matrix is associated with an l-th layer of the PUSCH transmission, and is given by $$W_{l,m,n}^{(l)} = \frac{1}{s}\begin{bmatrix} v_{l,m} \\ \varphi_n v_{l,m} \end{bmatrix},$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T,$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases},$$

$$\varphi_n = e^{j\pi n/2},$$

wherein: $l \in \{1, \ldots, v\}$ and v is a number of layers of the PUSCH transmission, $N_1$ and $N_2$ are number of antenna ports with the same polarization in first and second dimensions, respectively, $O_1$ and $O_2$ are oversampling factors in the first and second dimensions, respectively, and S is a scaling factor.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for transmitting a UE capability information about an uplink (UL) codebook for 8 antenna ports; receiving an indication indicating a transmit precoding matrix indicator (TPMI) for a transmission of a physical uplink shared channel (PUSCH); and transmitting the PUSCH based on the indicated TPMI, wherein the TPMI indicates a precoding matrix from the UL codebook for the 8 antenna ports, the UL codebook includes full-coherent (FC) precoding matrices comprising all non-zero entries, and an l-th column of a FC precoding matrix is associated with an l-th layer of the PUSCH transmission, and is given by $$W^{(l)}_{l,m,n} = \frac{1}{s}\begin{bmatrix} v_{l,m} \\ \varphi_n v_{l,m} \end{bmatrix},$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T,$$

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases},$$

$$\varphi_n = e^{j\pi n/2},$$

wherein: l∈{1, . . . , v} and v is a number of layers of the PUSCH transmission, $N_1$ and $N_2$ are number of antenna ports with the same polarization in first and second dimensions, respectively, $O_1$ and $O_2$ are oversampling factors in the first and second dimensions, respectively, and S is a scaling factor. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
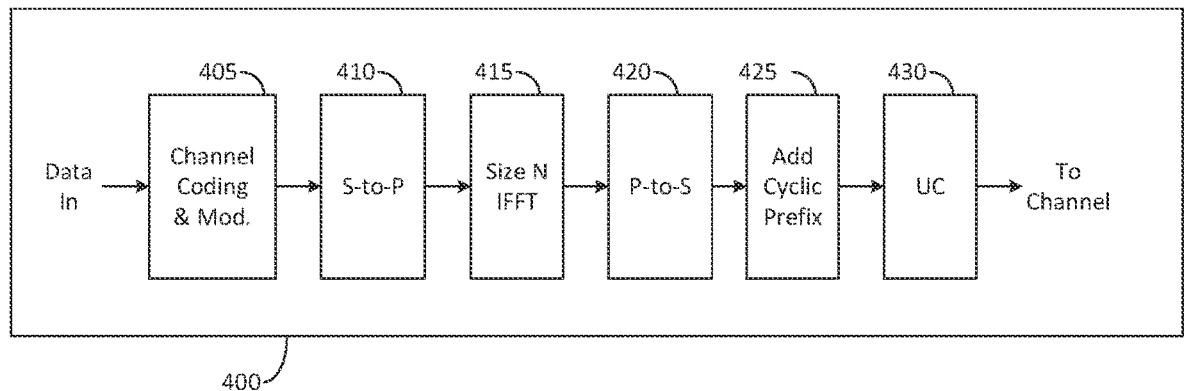
FIG. 4A illustrates a high-level diagram of an orthogonal frequency division multiple access transmit path according to embodiments of the present disclosure.
Figure 4B:
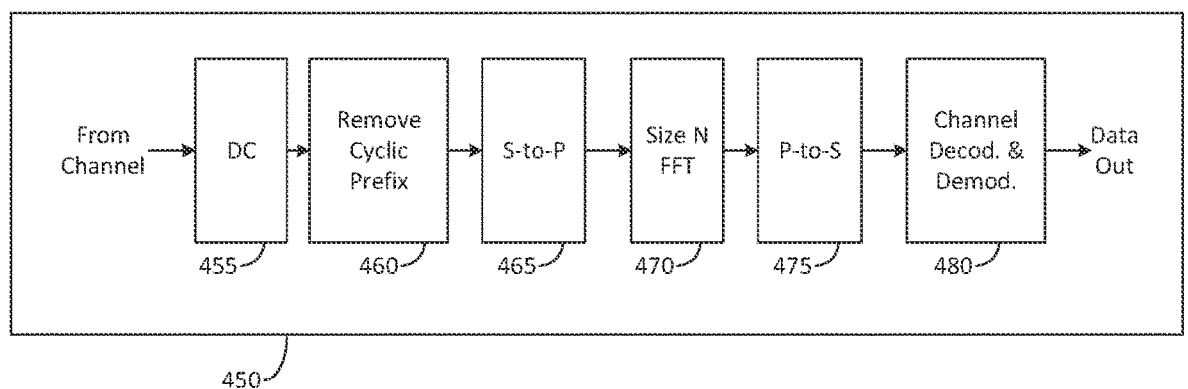
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals.

Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine-time communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{uL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb} = 2 \cdot (N_{symb}^{uL} - 1) - N_{SRS}$, where $N_{SRS}=1$ if a last subframe symbol is used to transmit SRS and $N_{SRS}=0$ otherwise.

Figure 5:
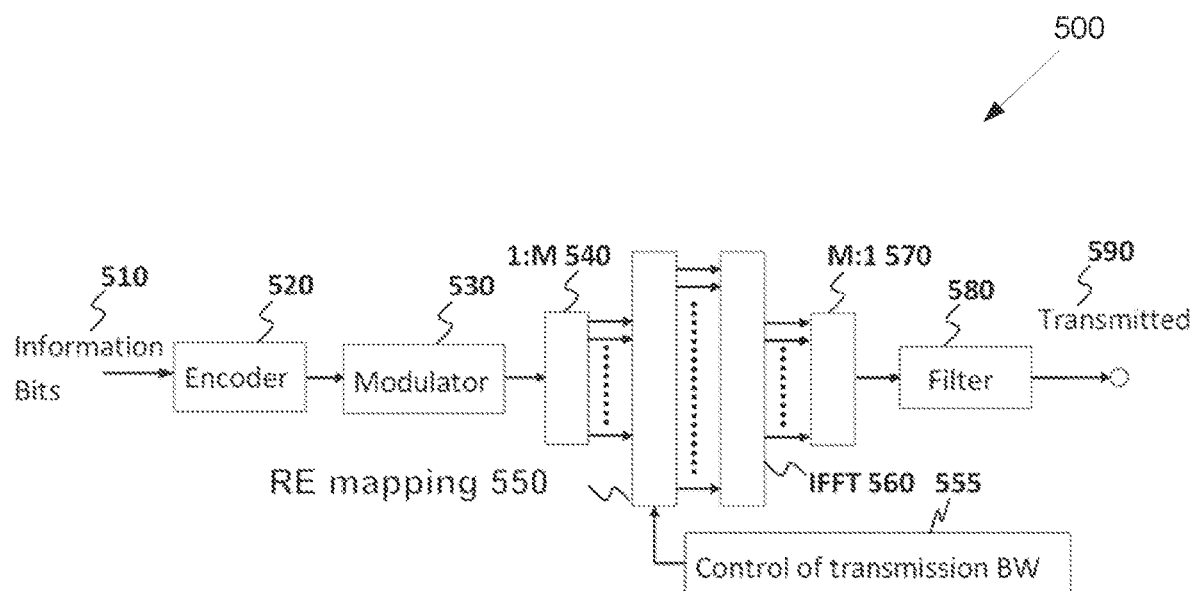
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial-to-serial (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel-to-serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
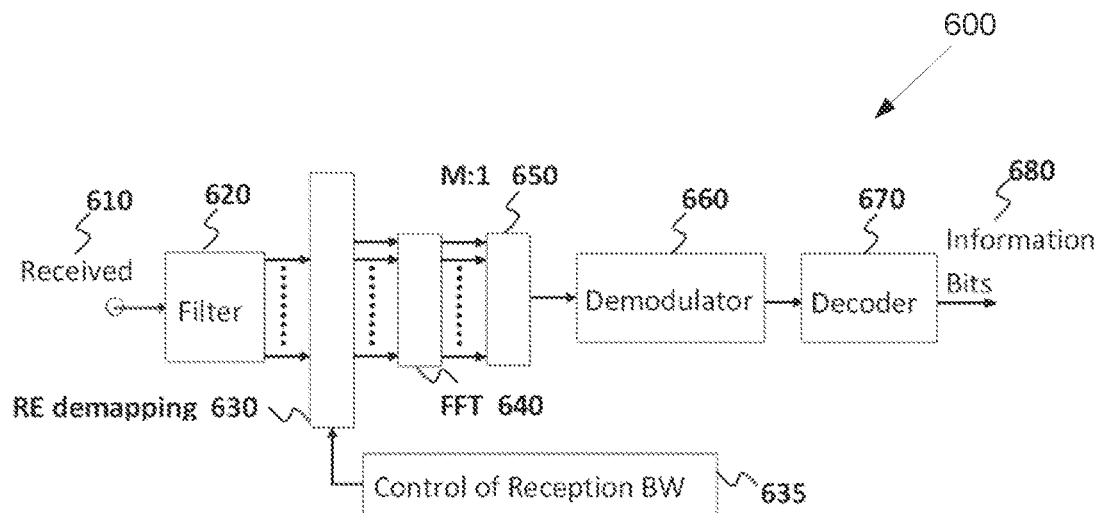
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
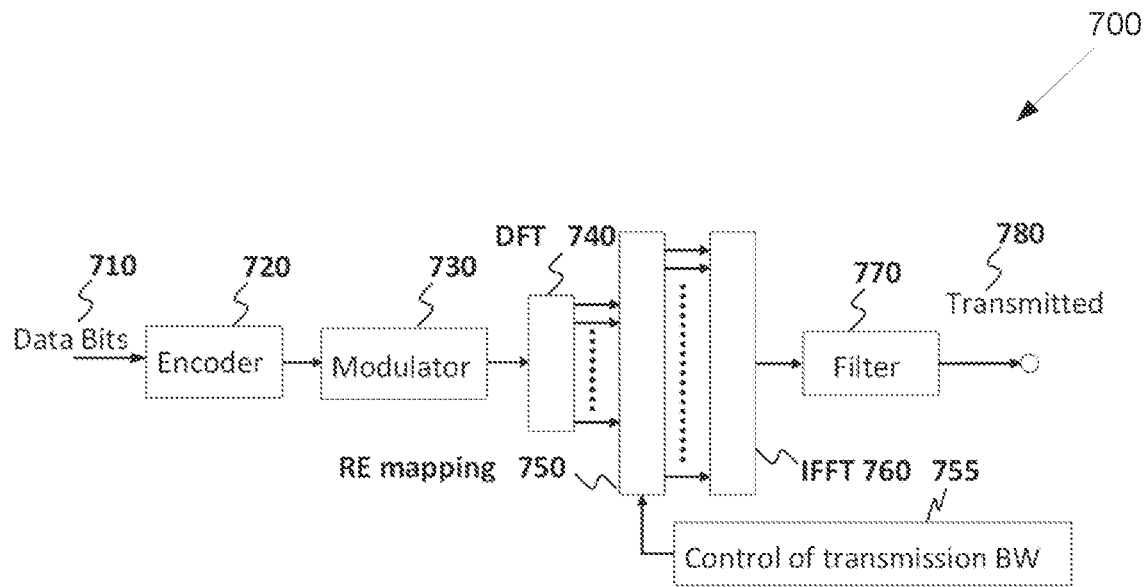
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
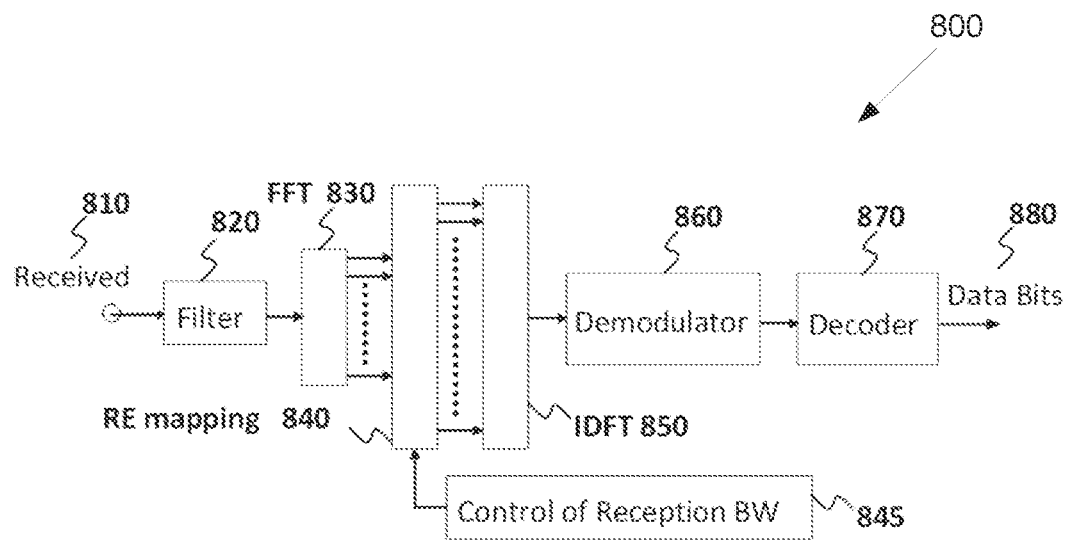
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies an FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth-generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 9:
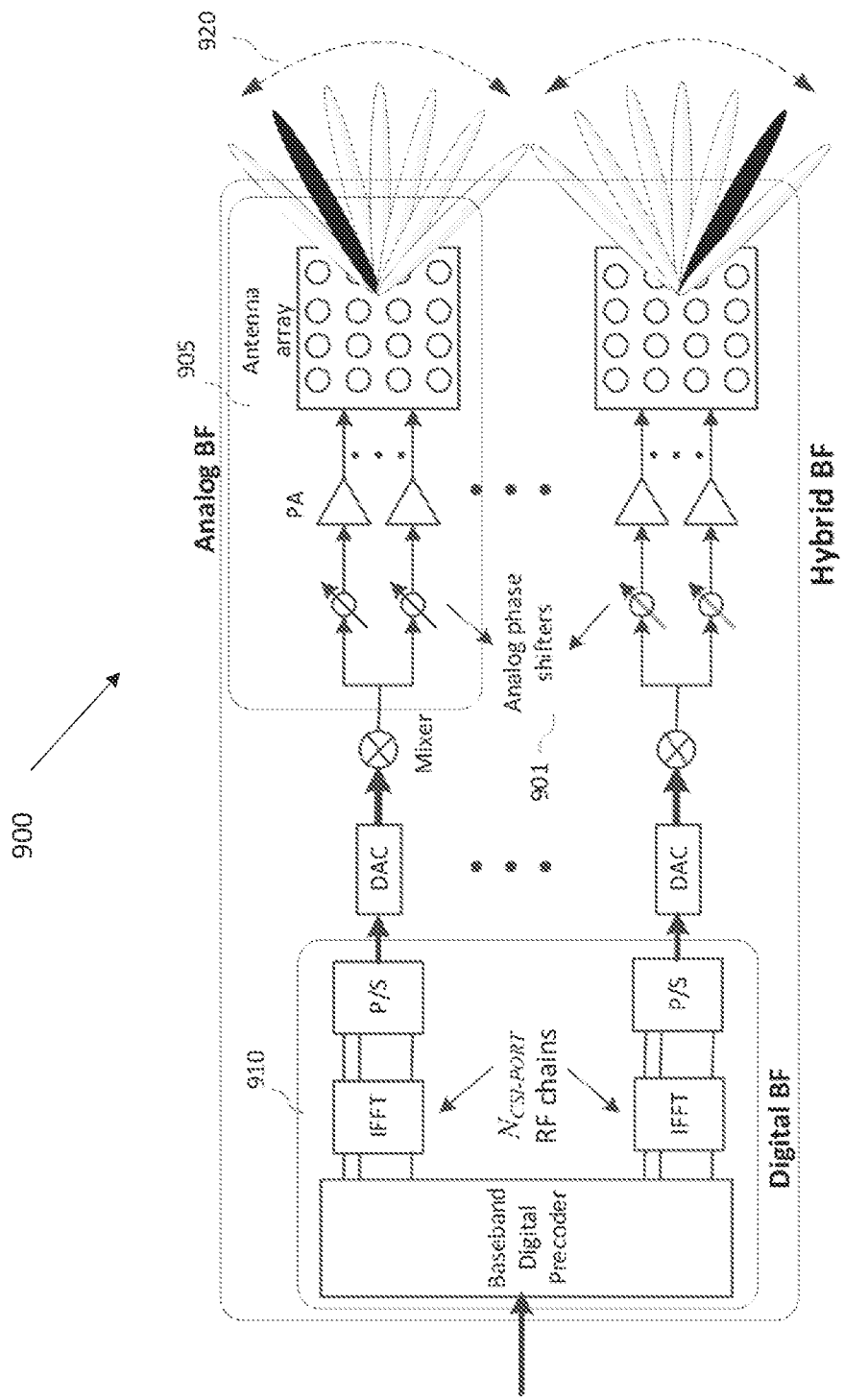
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @ 100 m distance), larger number of and sharper analog beams (hence larger number of radiators in the array) will be needed to compensate for the additional path loss.

In NR, two transmission schemes are supported for PUSCH: codebook based transmission and non-codebook based transmission. The UE is configured with codebook based transmission when the higher layer parameter txConfig in pusch-Config is set to 'codebook', the UE is configured non-codebook based transmission when the higher layer parameter txConfig is set to 'nonCodebook'.

According to Section 6.1.1.1 [REFS], the following is supported for codebook based UL transmission.

For codebook-based transmission, PUSCH can be scheduled by DCI format 0_0, DCI format 0_1, DCI format 0_2 or semi-statically configured to operate according to Clause 6.1.2.3 [REF9]. If this PUSCH is scheduled by DCI format 0_1, DCI format 0_2, or semi-statically configured to operate according to Clause 6.1.2.3 [REF9], the UE determines its PUSCH transmission precoder based on SRI, TPMI and the transmission rank, where the SRI, TPMI and the transmission rank are given by DCI fields of SRS resource indicator and Precoding information and number of layers in clause 7.3.1.1.2 and 7.3.1.1.3 of [5, REF] for DCI format 0_1 and 0_2 or given by srs-ResourceIndicator and precodingAndNumberOfLayers according to clause 6.1.2.3. The SRS-ResourceSet(s) applicable for PUSCH scheduled by DCI format 0_1 and DCI format 0_2 are defined by the entries of the higher layer parameter srs-ResourceSetToAddModList and srs-ResourceSetToAddModListDCI-0-2 in SRS-config, respectively. Only one SRS resource set can be configured in srs-ResourceSetToAddModList with higher layer parameter usage in SRS-ResourceSet set to 'codebook', and only one SRS resource set can be configured in srs-ResourceSetToAddModListDCI-0-2 with higher layer parameter usage in SRS-ResourceSet set to 'codebook'. The TPMI is used to indicate the precoder to be applied over the layers $\{0 \ldots v-1\}$ and that corresponds to the SRS resource selected by the SRI when multiple SRS resources are configured, or if a single SRS resource is configured TPMI is used to indicate the precoder to be applied over the layers $\{0 \ldots v-1\}$ and that corresponds to the SRS resource. The transmission precoder is selected from the uplink codebook that has a number of antenna ports equal to higher layer parameter nrofSRS-Ports in SRS-Config, as defined in Clause 6.3.1.5 of [4, TS 38.211]. When the UE is configured with the higher layer parameter txConfig set to 'codebook', the UE is configured with at least one SRS resource. The indicated SRI in slot n is associated with the most recent transmission of SRS resource identified by the SRI, where the SRS resource is prior to the PDCCH carrying the SRI.

For codebook based transmission, the UE determines its codebook subsets based on TPMI and upon the reception of higher layer parameter codebookSubset in pusch-Config for PUSCH associated with DCI format 0_1 and codebookSubsetDCI-0-2 in pusch-Config for PUSCH associated with DCI format 0_2 which may be configured with 'fullyAndPartialAndNonCoherent', or 'partialAndNonCoherent', or 'nonCoherent' depending on the UE capability. When higher layer parameter ul-FullPowerTransmission is set to 'fullpowerMode2' and the higher layer parameter codebookSubset or the higher layer parameter codebookSubsetForDCI-Format0-2 is set to 'partialAndNonCoherent', and when the SRS-resourceSet with usage set to "codebook" includes at least one SRS resource with 4 ports and one SRS resource with 2 ports, the codebookSubset associated with the 2-port SRS resource is 'nonCoherent'. The maximum transmission rank may be configured by the higher layer parameter maxRank in pusch-Config for PUSCH scheduled with DCI format 0_1 and maxRank-ForDCIFormat0_2 for PUSCH scheduled with DCI format 0_2.

A UE reporting its UE capability of 'partialAndNonCoherent' transmission may not expect to be configured by either codebookSubset or codebookSubsetForDCI-Format0-2 with 'fullyAndPartialAndNonCoherent'.

A UE reporting its UE capability of 'nonCoherent' transmission may not expect to be configured by either codebookSubset or codebookSubsetForDCI-Format0-2 with 'fullyAndPartialAndNonCoherent' or with 'partialAndNonCoherent'.

A UE may not expect to be configured with the higher layer parameter codebookSubset or the higher layer parameter codebookSubsetForDCI-Format0-2 set to 'partialAndNonCoherent' when higher layer parameter nrofSRS-Ports in an SRS-ResourceSet with usage set to 'codebook' indicates that the maximum number of the configured SRS antenna ports in the SRS-ResourceSet is two.

For codebook-based transmission, only one SRS resource can be indicated based on the SRI from within the SRS resource set. Except when higher layer parameter ul-FullPowerTransmission is set to 'fullpowerMode2', the maximum number of configured SRS resources for codebook-based transmission is 2. If aperiodic SRS is configured for a UE, the SRS request field in DCI triggers the transmission of aperiodic SRS resources.

A UE may not expect to be configured with higher layer parameter ul-FullPowerTransmission set to 'fullpowerModel' and codebookSubset or codebookSubsetDCI-0-2 set to 'fullAndPartialAndNonCoherent' simultaneously.

The UE may transmit PUSCH using the same antenna port(s) as the SRS port(s) in the SRS resource indicated by the DCI format 0_1 or 0_2 or by configuredGrantConfig according to clause 6.1.2.3.

The DM-RS antenna ports $\{\tilde{p}_0, \ldots, \tilde{p}_{v-1}\}$ in Clause 6.4.1.1.3 of [4, TS38.211] are determined according to the ordering of DM-RS port(s) given by Tables 7.3.1.1.2-6 to 7.3.1.1.2-23 in Clause 7.3.1.1.2 of [5, TS 38.212].

Except when higher layer parameter ul-FullPowerTransmission is set to 'fullpowerMode2', when multiple SRS resources are configured by SRS-ResourceSet with usage set to 'codebook', the UE may expect that higher layer parameters nrofSRS-Ports in SRS-Resource in SRS-ResourceSet may be configured with the same value for all these SRS resources.

In the rest of the disclosure, 'fullAndPartialAndNonCoherent', 'partialAndNonCoherent', and 'Non-Coherent' are referred to codebookSubsets depending on three coherence type/capability, where the term 'coherence' implies all or a subset of antenna ports at the UE that can be used to transmit a layer coherently. In particular, the term 'full-coherence' (FC) implies all antenna ports at the UE that can be used to transmit a layer coherently.

the term 'partial-coherence' (PC) implies a subset (at least two but less than all) of antenna ports at the UE that can be used to transmit a layer coherently.

the term 'non-coherence' (NC) implies only one antenna port at the UE that can be used to transmit a layer.

When the UE is configured with codebookSubset=lullAndPartialAndNonCoherenr, the UL codebook includes all three types (FC, PC, NC) of precoding matrices; when the UE is configured with codebookSubset='partialAndNonCoherent', the UL codebook includes two types (PC, NC) of precoding matrices; and when the UE is configured with codebookSubset='nonCoherent', the UL codebook includes only one type (NC) of precoding matrices.

According to Section 6.3.1.5 of REFI, for non-codebook-based UL transmission, the precoding matrix W equals the identity matrix. For codebook-based UL transmission, the precoding matrix W is given by W=1 for single-layer transmission on a single antenna port, otherwise by Table 1 to Table 6, which are copied below.

The rank (or number of layers) and the corresponding precoding matrix W are indicated to the UE using TRI and TPMI, respectively. In one example, this indication is joint via a field Trecoding information and number of layers' in DCI, e.g., using DCI format 0_1. In another example, this indication is via higher layer RRC signaling. In one example, the mapping between a field Trecoding information and number of layers' and TRI/TPMI is according to Section 7.3.1.1.2 of [REF10].

TABLE 1

Precoding matrix W for single-layer transmission using two antenna ports

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

TABLE 2

Precoding matrix W for single-layer transmission using four antenna ports with transform precoding disabled

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE 3

Precoding matrix W for two-layer transmission using two antenna ports with transform precoding disabled

| TPMI index | W (ordered from left to right in increasing order of TPMI index) |
|---|---|
| 0-2 | $\frac{1}{\sqrt{2}}\begin{bmatrix}1 & 0\\0 & 1\end{bmatrix}$ $\frac{1}{2}\begin{bmatrix}1 & 1\\1 & -1\end{bmatrix}$ $\frac{1}{2}\begin{bmatrix}1 & 1\\j & -j\end{bmatrix}$ |

TABLE 4

Precoding matrix W for two-layer transmission using four antenna ports with transform precoding disabled

| TPMI index | W (ordered from left to right in increasing order of TPMI index) |
|---|---|
| 0-3 | $\frac{1}{2}\begin{bmatrix}1 & 0\\0 & 1\\0 & 0\\0 & 0\end{bmatrix}$ $\frac{1}{2}\begin{bmatrix}1 & 0\\0 & 0\\0 & 1\\0 & 0\end{bmatrix}$ $\frac{1}{2}\begin{bmatrix}1 & 0\\0 & 0\\0 & 0\\0 & 1\end{bmatrix}$ $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ $\frac{1}{2}\begin{bmatrix}0 & 0\\0 & 0\\1 & 0\\0 & 1\end{bmatrix}$ $\frac{1}{2}\begin{bmatrix}1 & 0\\0 & 1\\1 & 0\\0 & -j\end{bmatrix}$ $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ $\frac{1}{2}\begin{bmatrix}1 & 0\\0 & 1\\-j & 0\\0 & -1\end{bmatrix}$ $\frac{1}{2}\begin{bmatrix}1 & 0\\0 & 1\\-1 & 0\\0 & -j\end{bmatrix}$ $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ $\frac{1}{2}\begin{bmatrix}1 & 0\\0 & 1\\j & 0\\0 & -1\end{bmatrix}$ $\frac{1}{2\sqrt{2}}\begin{bmatrix}1 & 1\\1 & 1\\1 & -1\\1 & -1\end{bmatrix}$ $\frac{1}{2\sqrt{2}}\begin{bmatrix}1 & 1\\1 & 1\\j & -j\\j & -j\end{bmatrix}$ |
| 16-19 | $\frac{1}{2\sqrt{2}}\begin{bmatrix}1 & 1\\j & j\\1 & -1\\j & -j\end{bmatrix}$ $\frac{1}{2\sqrt{2}}\begin{bmatrix}1 & 1\\j & j\\j & -j\\-1 & 1\end{bmatrix}$ $\frac{1}{2\sqrt{2}}\begin{bmatrix}1 & 1\\-1 & -1\\1 & -1\\-1 & 1\end{bmatrix}$ $\frac{1}{2\sqrt{2}}\begin{bmatrix}1 & 1\\-1 & -1\\j & -j\\-j & j\end{bmatrix}$ |
| 20-21 | $\frac{1}{2\sqrt{2}}\begin{bmatrix}1 & 1\\-j & -j\\1 & -1\\-j & j\end{bmatrix}$ $\frac{1}{2\sqrt{2}}\begin{bmatrix}1 & 1\\-j & -j\\j & -j\\1 & -1\end{bmatrix}$ — — |

TABLE 5

Precoding matrix W for three-layer transmission using four antenna ports with transform precoding disabled

| TPMI index | W (ordered from left to right in increasing order of TPMI index) | | | |
|---|---|---|---|---|
| 0-3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ | $\frac{1}{2\sqrt{3}}\begin{bmatrix}1&1&1\\1&-1&1\\1&1&-1\\1&-1&-1\end{bmatrix}$ |
| 4-6 | $\frac{1}{2\sqrt{3}}\begin{bmatrix}1&1&1\\1&-1&1\\j&j&-j\\j&-j&-j\end{bmatrix}$ | $\frac{1}{2\sqrt{3}}\begin{bmatrix}1&1&1\\-1&1&-1\\1&1&-1\\-1&1&1\end{bmatrix}$ | $\frac{1}{2\sqrt{3}}\begin{bmatrix}1&1&1\\-1&1&-1\\j&j&-j\\-j&j&j\end{bmatrix}$ | — |

TABLE 6

Precoding matrix W for four-layer transmission using four antenna ports with transform precoding disabled

| TPMI index | W (ordered from left to right in increasing order of TPMI index) | | | |
|---|---|---|---|---|
| 0-3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&j&-j\end{bmatrix}$ | $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ | — | — | — |

The subset of TPMI indices for the three coherence types are summarized in Table 7 and Table 8, where rank=r corresponds to (and is equivalent to) r layers.

TABLE 7

Total power of precoding matrix W for 2 antenna ports

| | Non-Coherent (NC) TPMIs | | Full-Coherent (FC) TPMIs | |
|---|---|---|---|---|
| Rank | TPMI indices | Total power | TPMI indices | Total power |
| 1 | 0-1 | ½ | 2-5 | 1 |
| 2 | 0 | 1 | 1-2 | 1 |

TABLE 8

Total power of precoding matrix W for 4 antenna ports

| | Non-Coherent (NC) TPMIs | | Partial-Coherent (PC) TPMIs | | Full-Coherent (FC) TPMIs | |
|---|---|---|---|---|---|---|
| Rank | TPMI indices | Total power | TPMI indices | Total power | TPMI indices | Total power |
| 1 | 0-3 | ¼ | 4-11 | ½ | 12-27 | 1 |
| 2 | 0-5 | ½ | 6-13 | 1 | 14-21 | 1 |
| 3 | 0 | ¾ | 1-2 | 1 | 3-6 | 1 |
| 4 | 0 | 1 | 1-2 | 1 | 3-4 | 1 |

The corresponding supported codebookSubsets are summarized in Table 9 and Table 10.

TABLE 9

TPMI indices for codebookSubsets for 2 antenna ports

| Rank | Non-coherent | fullAndPartialAndNonCoherent |
|---|---|---|
| 1 | 0-1 | 0-5 |
| 2 | 0 | 0-2 |

TABLE 10

TPMI indices for codebookSubsets for 4 antenna ports

| Rank | Non-coherent | partialAndNonCoherent | fullAndPartialAndNonCoherent |
|---|---|---|---|
| 1 | 0-3 | 0-11 | 0-27 |
| 2 | 0-5 | 0-13 | 0-21 |
| 3 | 0 | 0-2 | 0-6 |
| 4 | 0 | 0-2 | 0-4 |

In up to Rel. 17 NR, for UL transmission, the 3GPP specification supports 1, 2, or 4 SRS antenna ports in one SRS resource. In more advanced UL MIMO systems (e.g., in Rel. 18 and beyond), the number of SRS antenna ports can be more than 4, e.g., 6, 8, or even 12, and 16, especially for devices such as CPE, FWA, and vehicular UEs. The codebook-based UL transmission for such devices requires enhancements, e.g., codebook for >=4 antenna ports and related signaling for efficient UL MIMO operations. This disclosure provides example embodiments for potential enhancements. The scope of the disclosure is not limited to only these embodiments but includes any extensions or combinations of the proposed embodiments.

Figure 10:
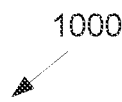
FIG. 10 illustrates an example of antenna port layouts at a UE according to embodiments of the present disclosure.

FIG. 10 illustrates an example of antenna port layouts 1000 at a UE according to embodiments of the present disclosure. The embodiment of the antenna port layouts 1000 illustrated in FIG. 10 is for illustration only. FIG. 10 does not limit the scope of this disclosure to any particular implementation of the antenna port layouts 1000.

In one embodiment, it is assumed that all antenna ports of the UE belong to a single antenna panel (i.e., they are co-located, for example, at one plane, side, or edge of the UE). It is further assumed that $N_1$ and $N_2$ are the number of antenna ports with the same polarization in the first and second dimensions, respectively. For 2D antenna port layouts, we have $N_1>1$, $N_2>1$, and for 1D antenna port layouts, we either have $N_1>1$ and $N_2=1$ or $N_2>1$ and $N_1=1$. In the rest of the disclosure, 1D antenna port layouts with $N_1>1$ and $N_2=1$ is considered. The disclosure, however, is applicable to the other 1D port layouts with $N_2>1$ and $N_1=1$. Also, in the rest of the disclosure, we assume that $N_1>N_2$. The disclosure, however, is applicable to the case when $N_1<N_2$, and the embodiments for $N_1>N_2$ applies to the case $N_1<N_2$ by swapping/switching $(N_1, N_2)$ with $(N_2, N_1)$. For a (single-polarized) co-polarized antenna port layout, the total number of antenna ports is $N_1 N_2$ and for a dual-polarized antenna port layout, the total number of antenna ports is $2N_1 N_2$. An illustration of antenna port layouts for {2, 4, 6, 8, 12} antenna ports at the UE is shown in FIG. 10.

Let s denote the number of antenna polarizations (or groups of antenna ports with the same polarization). Then, for co-polarized antenna ports, s=1, and for dual- or cross (X)-polarized antenna ports s=2. So, the total number of antenna ports $P=sN_1 N_2$. In one example, the antenna ports at the UE refers to SRS antenna ports (either in one SRS resource or across multiple SRS resources).

In one embodiment, the UL codebook W for P antenna ports at the UE is based on precoding vectors which are according to one of the two alternatives in Table 11 depending on whether the antenna ports are co-polarized or cross-/dual-polarized.

TABLE 11

| Pre-coding vectors | |
|---|---|
| Co-pol | Dual-pol |
| $v_{l,m} = \dfrac{v_{l,m}}{\sqrt{N_1 N_2}}$ | $v_{l,m,n} = \dfrac{1}{\sqrt{2N_1 N_2}} \begin{bmatrix} v_{l,m} \\ \varphi_n v_{l,m} \end{bmatrix}$ |

Here, $v_{l,m}$, is a Kronecker product ($\otimes$) of vectors $w_l$ and $u_m$ of lengths $N_1$ and $N_2$, respectively. In one example, $w_l$ and $u_m$ are oversampled DFT vectors, i.e., $$w_l = \begin{bmatrix} 1 & e^{j\frac{2\pi l}{O_1 N_1}} & e^{j\frac{4\pi l}{O_1 N_1}} & \ldots & e^{j\frac{2\pi l(N_1-1)}{O_1 N_1}} \end{bmatrix}^T$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

where $O_1$ and $O_2$ are oversampling factors in two dimensions, and $v_{l,m}$, is then given by $$v_{l,m} = w_l \otimes u_m = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

In one example, both $O_1, O_2 \in \{2,4,8\}$. In one example, $O_1$ and $O_2$ can take the same values as Rel.15 NR Type I codebook (cf. 5.2.2.2.1, TS 38.214), i.e., $(O_1, O_2)=(4,4)$ when $N_2>1$, and, i.e., $(O_1, O_2)=(4,1)$ when $N_2=1$. Alternatively, they take different values from the Rel. 15 Type I NR codebook, for example, $(O_1, O_2)=(2,2)$ when $N_2>1$, and, i.e., $(O_1, O_2)=(2,1)$ when $N_2=1$. In one example, $O_1$ and $O_2$ is configurable (e.g., via higher layer).

The quantity $\varphi_n$ is a co-phase for dual-polarized antenna port layouts. In one example, $\varphi_n = e^{j\pi n/2}$, where $n \in \{0,1,2,3\}$ implying that $\varphi_n$ belongs to QPSK alphabet $\{1, j, -1, -j\}$.

In one example, the values of $N_1$ and $N_2$ are configured, e.g., with the higher layer parameter n1-n2-ul. The supported configurations of $(N_1, N_2)$ for a given number of antenna ports (P) is given in Table 12.

TABLE 12

| Configurations of $(N_1, N_2)$ | | |
|---|---|---|
| Number of antenna ports, P | Dual-pol $(N_1, N_2)$ | Co-pol $(N_1, N_2)$ |
| 2 | (1, 1) | (2, 1) |
| 4 | (2, 1) | (2, 2), (4, 1) |
| 6 | (3, 1) | (3, 2), (6, 1) |
| 8 | (2, 2), (4, 1) | (4, 2), (8, 1) |
| 12 | (3, 2), (6, 1) | (4, 3), (6, 2), (12, 1) |
| 16 | (4, 2), (8, 1) | (8, 2), (4, 4), (16, 1) |

In one example, the values of $N_1$ and $N_2$ are fixed for a given number of antenna ports. For example, $(N_1, N_2)=(P, 1)$ for co-pol and $$\left(\frac{P}{2}, 1\right)$$

for dual-pol antenna. In one example, only one $(N_1, N_2)$ is supported for each value of P, where the supported $(N_1, N_2)$ is one of pairs in Table 12.

The dual-polarized antenna layout is assumed in the rest of the disclosure.

In one embodiment, the UL codebook includes full-coherent (FC) precoding matrices, and a FC precoding matrix can be defined as a matrix with all non-zero elements/entries. Similar to Rel. 15 UL codebook for 4 antenna ports, the UL codebook for >4 antenna ports either includes precoding matrices from the DL Type I codebook or are based on the DL Type I codebook framework.

The FC TPMIs in Rel.15 UL codebook for 4 antenna ports indicate precoding matrices that belong to DL Type I codebook. For multiple rank values, there are two methods in which this mapping between UL and DL Type I codebooks can be described.

Method 1: Fixed oversampling $O_1$, and varying step-size or resolution of $i_{1,1}$ Method 2: varying oversampling $O_1$, and fixed step-size or resolution of $i_{1,1}$ For Method 1, the mapping between the UL FC TPMIs and corresponding DL Type I codebook parameters can be summarized as in Table 13 (Method 1A: $O_1$ is fixed to 2, step size of $i_{1,1}$ changes from 1 to 2), or equivalently as in Table 14 (Method 1B: $O_1$ is fixed to 4, step size of $i_{1,1}$ changes from 2 to 4).

For Method 2, the mapping between the UL FC TPMIs and corresponding DL Type I codebook parameters can be summarized as in Table 15 (Method 1A: $O_1$ changes from 2 to 1, step size of $i_{1,1}$ is fixed to 1) and Table 16 (Method 1B: $O_1$ changes from 4 to 2, step size of $i_{1,1}$ is fixed to 2).

TABLE 13

Mapping between UL and DL Type I precoding matrices for 4 antenna ports, Method 1A

| | UL codebook | | DL Type I codebook | | | | |
|---|---|---|---|---|---|---|---|
| Rank | FC TPMIs | CodebookMode | $O_1$ | $i_{1,1}$ | $i_{1,2}$ | $i_{1,3}$ | $i_2$ |
| 1 | 12-27 | 1 | 2 | 0, 1, 2, 3 | 0 | — | 0, 1, 2, 3 |
| 2 | 14-21 | 1 | 2 | 0, 1, 2, 3 | 0 | 0 | 0, 1 |
| 3 | 3-6 | 1-2 | 2 | 0, 2 | 0 | 0 | 0, 1 |
| 4 | 3-4 | 1-2 | 2 | 0 | 0 | 0 | 0, 1 |

TABLE 14

Mapping between UL and DL Type I precoding matrices for 4 antenna ports, Method 1B

| | UL codebook | | DL Type I codebook | | | | |
|---|---|---|---|---|---|---|---|
| Rank | FC TPMIs | CodebookMode | $O_1$ | $i_{1,1}$ | $i_{1,2}$ | $i_{1,3}$ | $i_2$ |
| 1 | 12-27 | 1 | 4 | 0, 2, 4, 6 | 0 | — | 0, 1, 2, 3 |
| 2 | 14-21 | 1 | 4 | 0, 2, 4, 6 | 0 | 0 | 0, 1 |
| 3 | 3-6 | 1-2 | 4 | 0, 4 | 0 | 0 | 0, 1 |
| 4 | 3-4 | 1-2 | 4 | 0 | 0 | 0 | 0, 1 |

TABLE 15

Mapping between UL and DL Type I precoding matrices for 4 antenna ports, Method 2A

| | UL codebook | | DL Type I codebook | | | | |
|---|---|---|---|---|---|---|---|
| Rank | FC TPMIs | CodebookMode | $O_1$ | $i_{1,1}$ | $i_{1,2}$ | $i_{1,3}$ | $i_2$ |
| 1 | 12-27 | 1 | 2 | 0, 1, 2, 3 | 0 | — | 0, 1, 2, 3 |
| 2 | 14-21 | 1 | 2 | 0, 1, 2, 3 | 0 | 0 | 0, 1 |
| 3 | 3-6 | 1-2 | 1 | 0, 1 | 0 | 0 | 0, 1 |
| 4 | 3-4 | 1-2 | 1 | 0 | 0 | 0 | 0, 1 |

TABLE 16

Mapping between UL and DL Type I precoding matrices for 4 antenna ports, Method 2B

| | UL codebook | | DL Type I codebook | | | | |
|---|---|---|---|---|---|---|---|
| Rank | FC TPMIs | CodebookMode | $O_1$ | $i_{1,1}$ | $i_{1,2}$ | $i_{1,3}$ | $i_2$ |
| 1 | 12-27 | 1 | 4 | 0, 2, 4, 6 | 0 | — | 0, 1, 2, 3 |
| 2 | 14-21 | 1 | 4 | 0, 2, 4, 6 | 0 | 0 | 0, 1 |
| 3 | 3-6 | 1-2 | 2 | 0, 2 | 0 | 0 | 0, 1 |
| 4 | 3-4 | 1-2 | 1 | 0 | 0 | 0 | 0, 1 |

Similar to 4 antenna ports, the UL codebook for >4 antenna ports (e.g., 6, 8, 12, 16 antenna ports) includes full-coherent (FC) precoding matrices, where the included FC precoding matrices are determined or can be described according to at least one of the following examples.

In one example, the included FC precoding matrices are determined using the same values of $O_1$ and $i_{1,1}$ as in Rel.15 (cf. Table 13-Table 16). For a 2D antenna layout, $O_1=O_2$ and $i_{1,1}=i_{1,2}$, and the values of $O_1$ and $i_{1,1}$ are as in Rel.15 (cf. Table 13-Table 16). The other codebook parameter values (CodebookMode, $i_{1,3}$ and $i_2$) are the same as in above tables (as in DL Type I codebook). In one example, the indicator $i_{1,3}$ for rank 2-4 is fixed, e.g., $i_{1,3}=0$. In one example, CodebookMode is fixed, e.g., mode 1.

In one example, the included FC precoding matrices are determined by extending the Rel.15 design. In particular, one of the methods (Method 1A, 1B, 2A, 2B) described above is extended to more than 4 antenna ports. For a 1D antenna port layout, $O_2=1$ and $O_1$ value is the same as in Method 1A/1B/2A/2B. For a 2D antenna port layout, $O_2$ can be fixed (e.g., 2 or 4), and $O_1$ value is the same as in Method 1A/1B/2A/2B. Or, for a 2D antenna port layout, both $O_2=O_1$ and $O_1$ value is the same as in Method 1A/1B/2A/2B. In one example, the codebook indices for the four methods and more than 4 antenna ports are as shown in Table 17 through Table 26. The other codebook parameter values (CodebookMode, $i_{1,3}$ and $i_2$) are the same as in above tables (as in DL Type I codebook). In one example, the indicator $i_{1,3}$ for rank 2-4 is fixed, e.g., $i_{1,3}=0$. In one example, CodebookMode is fixed, e.g., mode 1.

TABLE 17

FC precoding matrices based on DL Type I codebook indices for 6 and 8 ports, Method 1A

| | 6 ports: $(N_1, N_2) = (3, 1)$ | | 8 ports: $(N_1, N_2) = (4, 1)$ | | 8 ports: $(N_1, N_2) = (2, 2)$ | | |
|---|---|---|---|---|---|---|---|
| Rank | $O_1$ | $i_{1,1}$ | $O_1$ | $i_{1,1}$ | $(O_1, O_2)$ | $i_{1,1}$ | $i_{1,2}$ |
| 1 | 2 | $0, 1, \ldots, O_1N_1 - 1$ | 2 | $0, 1, \ldots, O_1N_1 - 1$ | (2, 2) | $0, 1, \ldots, O_1N_1 - 1$ | $0, 1, \ldots, O_2N_2 - 1$ |
| 2 | 2 | $0, 1, \ldots, O_1N_1 - 1$ | 2 | $0, 1, \ldots, O_1N_1 - 1$ | (2, 2) | $0, 1, \ldots, O_1N_1 - 1$ | $0, 1, \ldots, O_2N_2 - 1$ |
| 3 | 2 | $0, 2, \ldots, O_1N_1 - 2$ | 2 | $0, 2, \ldots, O_1N_1 - 2$ | (2, 2) | $0, 2, \ldots, O_1N_1 - 2$ | $0, 2, \ldots, O_2N_2 - 2$ |
| 4 | 2 | $0, 2, \ldots, O_1N_1 - 2$ | 2 | $0, 2, \ldots, O_1N_1 - 2$ | (2, 2) | $0, 2, \ldots, O_1N_1 - 2$ | $0, 2, \ldots, O_2N_2 - 2$ |
| 5 | 2 | 0 | 2 | 0, 2 | (2, 2) | 0, 2 | 0, 2 |
| 6 | 2 | 0 | 2 | 0, 2 | (2, 2) | 0, 2 | 0, 2 |
| 7 | | | 2 | 0 | (2, 2) | 0 | 0 |
| 8 | | | 2 | 0 | (2, 2) | 0 | 0 |

TABLE 18

FC precoding matrices based on DL Type I codebook indices for 6 and 8 ports, Method 1A

| | 8 ports: $(N_1, N_2) = (4, 1)$ | | 8 ports: $(N_1, N_2) = (2, 2)$ | | |
|---|---|---|---|---|---|
| Rank | $O_1$ | $i_{1,1}$ | $(O_1, O_2)$ | $i_{1,1}$ | $i_{1,2}$ |
| 1 | 1 | $0, 1, \ldots, O_1N_1 - 1$ | (2, 2) | $0, 1, \ldots, O_1N_1 - 1$ | $0, 1, \ldots, O_2N_2 - 1$ |
| 2 | 1 | $0, 1, \ldots, O_1N_1 - 1$ | (2, 2) | $0, 1, \ldots, O_1N_1 - 1$ | $0, 1, \ldots, O_2N_2 - 1$ |
| 3 | 1 | $0, 2, \ldots, O_1N_1 - 2$ | (2, 2) | $0, 2, \ldots, O_1N_1 - 2$ | $0, 2, \ldots, O_2N_2 - 2$ |
| 4 | 1 | $0, 2, \ldots, O_1N_1 - 2$ | (2, 2) | $0, 2, \ldots, O_1N_1 - 2$ | $0, 2, \ldots, O_2N_2 - 2$ |
| 5 | 1 | 0, 2 | (2, 2) | 0, 2 | 0, 2 |
| 6 | 1 | 0, 2 | (2, 2) | 0, 2 | 0, 2 |
| 7 | 1 | 0 | (2, 2) | 0 | 0 |
| 8 | 1 | 0 | (2, 2) | 0 | 0 |

TABLE 19

FC precoding matrices based on DL Type I codebook indices for $P = 2N_1N_2$ ports, Method 1A

| | 1D layout | | 2D layout | | |
|---|---|---|---|---|---|
| Rank | $O_1$ | $i_{1,1}$ | $(O_1, O_2)$ | $i_{1,1}$ | $i_{1,2}$ |
| 1 | 2 | $0, 1, \ldots, O_1N_1 - 1$ | (2, 2) | $0, 1, \ldots, O_1N_1 - 1$ | $0, 1 \ldots, O_2N_2 - 1$ |
| 2 | 2 | $0, 1, \ldots, O_1N_1 - 1$ | (2, 2) | $0, 1, \ldots, O_1N_1 - 1$ | $0, 1, \ldots, O_2N_2 - 1$ |
| 3 | 2 | $0, 2, \ldots, O_1N_1 - 2$ | (2, 2) | $0, 2, \ldots, O_1N_1 - 2$ | $0, 2, \ldots, O_2N_2 - 2$ |
| 4 | 2 | $0, 2, \ldots, O_1N_1 - 2$ | (2, 2) | $0, 2, \ldots, O_1N_1 - 2$ | $0, 2, \ldots, O_2N_2 - 2$ |
| 5 | 2 | $0, O_1$ | (2, 2) | $0, O_1$ | $0, O_2$ |
| 6 | 2 | $0, O_1$ | (2, 2) | $0, O_1$ | $0, O_2$ |
| 7 | 2 | 0 | (2, 2) | 0 | 0 |
| 8 | 2 | 0 | (2, 2) | 0 | 0 |

TABLE 20

FC precoding matrices based on DL Type I codebook indices for 6 and 8 ports, Method 1B

| | 6 ports: $(N_1, N_2) = (3, 1)$ | | 8 ports: $(N_1, N_2) = (4, 1)$ | | 8 ports: $(N_1, N_2) = (2, 2)$ | | |
|---|---|---|---|---|---|---|---|
| Rank | $O_1$ | $i_{1,1}$ | $O_1$ | $i_{1,1}$ | $(O_1, O_2)$ | $i_{1,1}$ | $i_{1,2}$ |
| 1 | 4 | $1, 2, \ldots, O_1N_1 - 2$ | 4 | $0, 2, \ldots, O_1N_1 - 2$ | (4, 4) | $0, 2, \ldots, O_1N_1 - 2$ | $0, 2, \ldots, O_2N_2 - 2$ |
| 2 | 4 | $0, 2, \ldots, O_1N_1 - 2$ | 4 | $0, 2, \ldots, O_1N_1 - 2$ | (4, 4) | $0, 2, \ldots, O_1N_1 - 2$ | $0, 2, \ldots, O_2N_2 - 2$ |
| 3 | 4 | $0, 4, \ldots, O_1N_1 - 4$ | 4 | $0, 4, \ldots, O_1N_1 - 4$ | (4, 4) | $0, 4, \ldots, O_1N_1 - 4$ | $0, 4, \ldots, O_2N_2 - 4$ |
| 4 | 4 | $0, 4, \ldots, O_1N_1 - 4$ | 4 | $0, 4, \ldots, O_1N_1 - 4$ | (4, 4) | $0, 4, \ldots, O_1N_1 - 4$ | $0, 4, \ldots, O_2N_2 - 4$ |
| 5 | 4 | 0 | 4 | 0, 4 | (4, 4) | 0, 4 | 0, 4 |
| 6 | 4 | 0 | 4 | 0, 4 | (4, 4) | 0, 4 | 0, 4 |
| 7 | | | 4 | 0 | (4, 4) | 0 | 0 |
| 8 | | | 4 | 0 | (4, 4) | 0 | 0 |

TABLE 21

FC precoding matrices based on DL Type I codebook indices for 6 and 8 ports, Method 1A

| | 8 ports: $(N_1, N_2) = (4, 1)$ | | 8 ports: $(N_1, N_2) = (2, 2)$ | | |
|---|---|---|---|---|---|
| Rank | $O_1$ | $i_{1,1}$ | $(O_1, O_2)$ | $i_{1,1}$ | $i_{1,2}$ |
| 1 | 4 | $0, 4, \ldots, O_1N_1 - 4$ | (4, 4) | $0, 2, \ldots, O_1N_1 - 2$ | $0, 2, \ldots, O_2N_2 - 2$ |
| 2 | 4 | $0, 4, \ldots, O_1N_1 - 4$ | (4, 4) | $0, 2, \ldots, O_1N_1 - 2$ | $0, 2, \ldots, O_2N_2 - 2$ |
| 3 | 4 | $0, 8, \ldots, O_1N_1 - 8$ | (4, 4) | $0, 4, \ldots, O_1N_1 - 4$ | $0, 4, \ldots, O_2N_2 - 4$ |
| 4 | 4 | $0, 8, \ldots, O_1N_1 - 8$ | (4, 4) | $0, 4, \ldots, O_1N_1 - 4$ | $0, 4, \ldots, O_2N_2 - 4$ |
| 5 | 4 | 0, 8 | (4, 4) | 0, 4 | 0, 4 |
| 6 | 4 | 0, 8 | (4, 4) | 0, 4 | 0, 4 |

TABLE 21-continued

FC precoding matrices based on DL Type I codebook indices for 6 and 8 ports, Method 1A

| | 8 ports: $(N_1, N_2) = (4, 1)$ | | 8 ports: $(N_1, N_2) = (2, 2)$ | | |
|---|---|---|---|---|---|
| Rank | $O_1$ | $i_{1,1}$ | $(O_1, O_2)$ | $i_{1,1}$ | $i_{1,2}$ |
| 7 | 4 | 0 | (4, 4) | 0 | 0 |
| 8 | 4 | 0 | (4, 4) | 0 | 0 |

TABLE 22

FC precoding matrices based on DL Type I codebook indices for $P = 2N_1N_2$ ports, Method IB

| | 1D layout | | 2D layout | | |
|---|---|---|---|---|---|
| Rank | $O_1$ | $i_{1,1}$ | $(O_1, O_2)$ | $i_{1,1}$ | $i_{1,2}$ |
| 1 | 4 | $0, 2, \ldots, O_1N_1 - 2$ | (4, 4) | $1, 2, \ldots, O_1N_1 - 2$ | $0, 2, \ldots, O_2N_2 - 2$ |
| 2 | 4 | $0, 2, \ldots, O_1N_1 - 2$ | (4, 4) | $0, 2, \ldots, O_1N_1 - 2$ | $0, 2, \ldots, O_2N_2 - 2$ |
| 3 | 4 | $0, 4, \ldots, O_1N_1 - 4$ | (4, 4) | $0, 4, \ldots, O_1N_1 - 4$ | $0, 4, \ldots, O_2N_2 - 4$ |
| 4 | 4 | $0, 4, \ldots, O_1N_1 - 4$ | (4, 4) | $0, 4, \ldots, O_1N_1 - 4$ | $0, 4, \ldots, O_2N_2 - 4$ |
| 5 | 4 | $0, O_1$ | (4, 4) | $0, O_1$ | $0, O_2$ |
| 6 | 4 | $0, O_1$ | (4, 4) | $0, O_1$ | $0, O_2$ |
| 7 | 4 | 0 | (4, 4) | 0 | 0 |
| 8 | 4 | 0 | (4, 4) | 0 | 0 |

TABLE 23

FC precoding matrices based on DL Type I codebook indices for 6 and 8 ports, Method 2A

| | 6 ports: $(N_1, N_2) = (3, 1)$ | | 8 ports: $(N_1, N_2) = (4, 1)$ | | 8 ports: $(N_1, N_2) = (2, 2)$ | | |
|---|---|---|---|---|---|---|---|
| Rank | $O_1$ | $i_{1,1}$ | $O_1$ | $i_{1,1}$ | $(O_1, O_2)$ | $i_{1,1}$ | $i_{1,2}$ |
| 1 | 2 | $0, 1, \ldots, O_1N_1 - 1$ | 2 | $0, 1, \ldots, O_1N_1 - 1$ | (2, 2) | $0, 1, \ldots, O_1N_1 - 1$ | $0, 1, \ldots, O_2N_2 - 1$ |
| 2 | 2 | $0, 1, \ldots, O_1N_1 - 1$ | 2 | $0, 1, \ldots, O_1N_1 - 1$ | (2, 2) | $0, 1, \ldots, O_1N_1 - 1$ | $0, 1, \ldots, O_2N_2 - 1$ |
| 3 | 1 | $0, 1, \ldots, O_1N_1 - 1$ | 1 | $0, 1, \ldots, O_1N_1 - 1$ | (1, 1) | $0, 1, \ldots, O_1N_1 - 1$ | $0, 1, \ldots, O_2N_2 - 1$ |
| 4 | 1 | $0, 1, \ldots, O_1N_1 - 1$ | 1 | $0, 1, \ldots, O_1N_1 - 1$ | (1, 1) | $0, 1, \ldots, O_1N_1 - 1$ | $0, 1, \ldots, O_2N_2 - 1$ |
| 5 | 1 | 0 | 1 | 0, 1 | (1, 1) | 0, 1 | 0, 1 |
| 6 | 1 | 0 | 1 | 0, 1 | (1, 1) | 0, 1 | 0, 1 |
| 7 | | | 1 | 0 | (1, 1) | 0 | 0 |
| 8 | | | 1 | 0 | (1, 1) | 0 | 0 |

TABLE 24

FC precoding matrices based on DL Type I codebook indices for P = $2N_1N_2$ ports, Method 2A

| | 1D layout | | 2D layout | | |
|---|---|---|---|---|---|
| Rank | $O_1$ | $i_{1,1}$ | $(O_1, O_2)$ | $i_{1,1}$ | $i_{1,2}$ |
| 1 | 2 | $0, 1, \ldots, O_1N_1 - 1$ | (2, 2) | $0, 1, \ldots, O_1N_1 - 1$ | $0, 1, \ldots, O_2N_2 - 1$ |
| 2 | 2 | $0, 1, \ldots, O_1N_1 - 1$ | (2, 2) | $0, 1, \ldots, O_1N_1 - 1$ | $0, 1, \ldots, O_2N_2 - 1$ |
| 3 | 1 | $0, 1, \ldots, O_1N_1 - 1$ | (1, 1) | $0, 1, \ldots, O_1N_1 - 1$ | $0, 1, \ldots, O_2N_2 - 1$ |
| 4 | 1 | $0, 1, \ldots, O_1N_1 - 1$ | (1, 1) | $0, 1, \ldots, O_1N_1 - 1$ | $0, 1, \ldots, O_2N_2 - 1$ |
| 5 | 1 | 0, 1 | (1, 1) | 0, 1 | 0, 1 |
| 6 | 1 | 0, 1 | (1, 1) | 0, 1 | 0, 1 |
| 7 | 1 | 0 | (1, 1) | 0 | 0 |
| 8 | 1 | 0 | (1, 1) | 0 | 0 |

TABLE 25

FC precoding matrices based on DL Type I codebook indices for 6 and 8 ports, Method 2B

| | 6 ports: $(N_1, N_2) = (3, 1)$ | | 8 ports: $(N_1, N_2) = (4, 1)$ | | 8 ports: $(N_1, N_2) = (2, 2)$ | | |
|---|---|---|---|---|---|---|---|
| Rank | $O_1$ | $i_{1,1}$ | $O_1$ | $i_{1,1}$ | $(O_1, O_2)$ | $i_{1,1}$ | $i_{1,2}$ |
| 1 | 4 | $0, 2, \ldots, O_1N_1 - 2$ | 4 | $0, 2, \ldots, O_1N_1 - 2$ | (4, 4) | $0, 2, \ldots, O_1N_1 - 2$ | $0, 2, \ldots, O_2N_2 - 2$ |
| 2 | 4 | $0, 2, \ldots, O_1N_1 - 2$ | 4 | $0, 2, \ldots, O_1N_1 - 2$ | (4, 4) | $0, 2, \ldots, O_1N_1 - 2$ | $0, 2, \ldots, O_2N_2 - 2$ |
| 3 | 2 | $0, 2, \ldots, O_1N_1 - 2$ | 2 | $0, 2, \ldots, O_1N_1 - 2$ | (2, 2) | $0, 2, \ldots, O_1N_1 - 2$ | $0, 2, \ldots, O_2N_2 - 2$ |
| 4 | 2 | $0, 2, \ldots, O_1N_1 - 2$ | 2 | $0, 2, \ldots, O_1N_1 - 2$ | (2, 2) | $0, 2, \ldots, O_1N_1 - 2$ | $0, 2, \ldots, O_2N_2 - 2$ |
| 5 | 1 | 0 | 1 | 0, 2 | (1, 1) | 0, 2 | 0, 2 |
| 6 | 1 | 0 | 1 | 0, 2 | (1, 1) | 0, 2 | 0, 2 |
| 7 | | | 1 | 0 | (1, 1) | 0 | 0 |
| 8 | | | 1 | 0 | (1, 1) | 0 | 0 |

TABLE 26

FC precoding matrices based on DL Type I codebook indices for P = $2N_1N_2$ ports, Method 2B

| | 1D layout | | 2D layout | | |
|---|---|---|---|---|---|
| Rank | $O_1$ | $i_{1,1}$ | $(O_1, O_2)$ | $i_{1,1}$ | $i_{1,2}$ |
| 1 | 4 | $0, 2, \ldots, O_1N_1 - 2$ | (4, 4) | $0, 2, \ldots, O_1N_1 - 2$ | $0, 2, \ldots, O_2N_2 - 2$ |
| 2 | 4 | $0, 2, \ldots, O_1N_1 - 2$ | (4, 4) | $0, 2, \ldots, O_1N_1 - 2$ | $0, 2, \ldots, O_2N_2 - 2$ |
| 3 | 2 | $0, 2, \ldots, O_1N_1 - 2$ | (2, 2) | $0, 2, \ldots, O_1N_1 - 2$ | $0, 2, \ldots, O_2N_2 - 2$ |
| 4 | 2 | $0, 2, \ldots, O_1N_1 - 2$ | (2, 2) | $0, 2, \ldots, O_1N_1 - 2$ | $0, 2, \ldots, O_2N_2 - 2$ |
| 5 | 1 | 0, 2 | (1, 1) | 0, 2 | 0, 2 |
| 6 | 1 | 0, 2 | (1, 1) | 0, 2 | 0, 2 |
| 7 | 1 | 0 | (1, 1) | 0 | 0 |
| 8 | 1 | 0 | (1, 1) | 0 | 0 |

In one example, the included FC precoding matrices correspond to all precoding matrices in Rel. 15 Type I codebook (as described in 5.2.2.2.5 of TS 38.214), which is based on a fixed oversampling factor ($O_1=4$, $O_2=1$ for 1D layout, and $O_1=O_2=4$ for 2D layout), and fixed $i_{1,1}$ step-size=1 (i.e., $i_{1,1}=0,1,\ldots,N_1O_1-1$, $i_{1,2}=0$ for 1D layout, and $i_{1,1}=0,1,\ldots,N_1O_1-1$, $i_{1,2}=0,1,\ldots,N_2O_2-1$ for 2D layout). The CodebookMode can be fixed (e.g., to 1). Or, CodebookMode can be configured, e.g., from {1,2} via higher layer, similar to DL Type I codebook. The index $i_{1,3}$ can be fixed to $i_{1,3}=0$. Or $i_{1,3}$ can be configured, similar to DL Type I codebook.

In one example, the included FC precoding matrices are determined using a method in which both oversampling factor and step-size can vary across rank values.

In one example, the included FC precoding matrices correspond to all precoding matrices in Rel. 15 Type I codebook framework wherein $O_1=O_2=x$, where x is fixed (e.g., 1 or 2) or configured (e.g., from 1 or 2 or 4). In one example, x depends on number of ports P (e.g., x=2 or 4 for P≤p and x=1 or 2 for P>p, where p is fixed for example to p=4).

In one example, the included FC precoding matrices correspond to all precoding matrices in Rel. 15 Type I codebook framework wherein $O_1=1$ or 2 for 1D layout ($N_2=1$), and $O_1=2$, $O_2=1$ for 2D layout ($N_2>1$).

In one example, the included FC precoding matrices for 6 antenna ports are according to one or more examples described above and that for 8 antenna ports are according to one or more examples described above, where either x=y∈{1, . . . , 6} or x≠y and x, y∈{1, . . . , 6}.

In one example, the included FC precoding matrices for $P_1$ antenna ports are according to one or more examples described above and that for $P_2$ antenna ports are according to one or more examples described above, where either x=y∈{1, . . . , 6} or x≠y and x, y∈{1, . . . , 6}. And ($P_1$, $P_2$)=(6,8) or (4,6) or (4,8) or (8,12) or (8,16).

In one example, when the UE is configured with a wideband (WB) TPMI (indicating a single frequency non-selective precoding matrix for all allocated PRBs for UL PUSCH transmission), the UL codebook for the TPMI indication is according to one of the examples described above. When the UE is configured with multiple subband (SB) TPMIs (indicating multiple frequency selective precoding matrices for multiple SBs in the allocated PRBs for UL PUSCH transmission), the UL codebook for the TPMI indication is either according to one of the examples described above or is fixed to Rel. 15 DL Type I codebook.

TABLE 27

| 8-Tx codebook | $(N_1, N_2)$ | $(O_1, O_2)$ | $i_{1,1}$ | $i_{1,2}$ | $i_2$ | TPMI | Precoder |
|---|---|---|---|---|---|---|---|
| Layout 1 | (4, 1) |  | $0, \ldots, 4O_1 - 1$ | 0 | 0, 1, 2, 3 |  | $W_{i_{1,1},0,i_2}^{(1)}$ |
| Example 1A |  | (4, 1) | $0, \ldots, 15$ | 0 |  | $0, 1, \ldots, 63$ |  |
| Example 1B |  | (2, 1) | $0, \ldots, 7$ | 0 |  | $0, 1, \ldots, 31$ |  |
| Example 1C |  | (1, 1) | $0, \ldots, 3$ | 0 |  | $0, 1, \ldots, 15$ |  | where $W_{l,0,n}^{(1)} = \frac{1}{S}\begin{bmatrix} v_{l,0} \\ \varphi_n v_{l,0} \end{bmatrix}$ and S is a scaling/normalization factor, e.g., $S = \sqrt{8} = 2\sqrt{2}$.
$u_m = u_0 = 1$ and $$v_{l,0} = \begin{bmatrix} 1 & e^{j\frac{2\pi l}{4O_1}} & e^{j\frac{4\pi l}{4O_1}} & e^{j\frac{6\pi l}{4O_1}} \end{bmatrix}^T = \begin{bmatrix} 1 & e^{j\frac{\pi l}{2O_1}} & e^{j\frac{2\pi l}{2O_1}} & e^{j\frac{3\pi l}{2O_1}} \end{bmatrix}^T$$

TABLE 28

| 8-Tx codebook | $(N_1, N_2)$ | $(O_1, O_2)$ | $i_{1,1}$ | $i_{1,2}$ | $i_2$ | TPMI | Precoder |
|---|---|---|---|---|---|---|---|
| Layout 2 | (2, 2) |  | $0, \ldots, 2O_1 - 1$ | $0, \ldots, 2O_2 - 1$ | 0, 1, 2, 3 |  | $W_{i_{1,1},i_{1,2},i_2}^{(1)}$ |
| Example 2A |  | (4, 4) | $0, \ldots, 7$ | $0, \ldots, 7$ |  | $0, 1, \ldots, 255$ |  |
| Example 2B |  | (2, 2) | $0, \ldots, 3$ | $0, \ldots, 3$ |  | $0, 1, \ldots, 63$ |  |
| Example 2C |  | (2, 1) | $0, \ldots, 3$ | 0, 1 |  | $0, 1, \ldots, 31$ |  |
| Example 2D |  | (1, 1) | 0, 1 | 0, 1 |  | $0, 1, \ldots, 15$ |  | where $W_{l,m,n}^{(1)} = \frac{1}{S}\begin{bmatrix} v_{l,m} \\ \varphi_n v_{l,m} \end{bmatrix}$ and S is a scaling/normalization factor, e.g., $S = \sqrt{8} = 2\sqrt{2}$.

$u_m = \begin{bmatrix} 1 & e^{j\frac{2\pi m}{2O_2}} \end{bmatrix}$ and $$v_{l,m} = \begin{bmatrix} u_m & e^{j\frac{2\pi l}{2O_1}} u_m \end{bmatrix}^T = \begin{bmatrix} 1 & e^{j\frac{2\pi m}{2O_2}} & e^{j\frac{\pi l}{2O_1}} & e^{j\frac{2\pi l}{2O_1}} e^{j\frac{2\pi m}{2O_2}} \end{bmatrix}^T = \begin{bmatrix} 1 & e^{j\frac{\pi m}{O_2}} & e^{j\frac{\pi l}{O_1}} & e^{j\pi\left(\frac{l}{O_1}+\frac{m}{O_2}\right)} \end{bmatrix}^T$$

In one example, when a single TPMI is used to indicate a precoder indicated by indices $(i_{1,1}, i_{1,2}, i_2)$, then number of TPMIs=number of $i_{11}$ indices×number of $i_{1,2}$ indices×number of $i_2$ indices=$N_1 O_1 \times N_2 O_2 \times 4$ (assuming the indicator $i_{1,3}$ for rank 2-4 in Rel.15 DL Type I codebook is fixed, e.g. $i_{1,3}=0$).

Assuming dual-polarized antennae, for 8 antenna ports, there are two antenna layouts, as in Rel. 15 DL Type I codebook, namely layout 1 and layout 2 (as shown in FIG. 10).

In Layout 1, $(N_1,N_2)=(4,1)$. Depending on the value of $(O_1, O_2)$, three examples of the rank 1 (i.e. 1 layer) codebook are shown in Table 27.

Example 1A: when $(O_1, O_2)=(4,1)$, there are 64 rank 1 precoders.

Example 1B: when $(O_1, O_2)=(2,1)$, there are 32 rank 1 precoders. When a single TPMI is used, an example of mapping/ordering TPMI indices to the precoders indicated by triple of indices $(i_{1,1},i_{1,2},i_2\ i_2)$ are shown in Table 29.

Example 1C: when $(O_1, O_2)=(1,1)$, there are 16 rank 1 precoders. When a single TPMI is used, an example of mapping/ordering TPMI indices to the precoders indicated by triple of indices $(i_{1,1},i_{1,2},i_2\ i_2)$ are shown in Table 30. The corresponding rank 1 precoders are tabulated in Table 33 which are determined based on $$v_{l,m} \in \left\{ \begin{bmatrix} 1 \\ 1 \\ 1 \\ 1 \end{bmatrix}, \begin{bmatrix} 1 \\ j \\ -1 \\ -j \end{bmatrix}, \begin{bmatrix} 1 \\ -1 \\ 1 \\ -1 \end{bmatrix}, \begin{bmatrix} 1 \\ -j \\ -1 \\ j \end{bmatrix} \right\}$$

and $\varphi_n \in \{1, j, -1, -j\}$.

In Layout 2, $(N_1,N_2)=(2,2)$. Depending on the value of $(O_1, O_2)$, four examples of the rank 1 (i.e. 1 layer) codebook are shown in Table 28.

Example 2A: when $(O_1, O_2)=(4,4)$, there are 256 rank 1 precoders.

Example 2B: when $(O_1, O_2)=(2,2)$, there are 64 rank 1 precoders.

Example 2C: when $(O_1, O_2)=(2,1)$, there are 32 rank 1 precoders. When a single TPMI is used, an example of mapping/ordering TPMI indices to the precoders indicated by triple of indices $(i_{1,1},i_{1,2},i_2)$ are shown in Table 31. Example 2D: when $(O_1, O_2)=(1,1)$, there are 16 rank 1 precoders. When a single TPMI is used, an example of mapping/ordering TPMI indices to the precoders indicated by triple of indices $(i_{1,1},i_{1,2}, i_2)$ are shown in Table 32. The corresponding rank 1 precoders are tabulated in Table 34 which are determined based on and $$v_{l,m} \in \left\{ \begin{bmatrix} 1 \\ 1 \\ 1 \\ 1 \end{bmatrix}, \begin{bmatrix} 1 \\ 1 \\ -1 \\ -1 \end{bmatrix}, \begin{bmatrix} 1 \\ -1 \\ 1 \\ -1 \end{bmatrix}, \begin{bmatrix} 1 \\ -1 \\ -1 \\ 1 \end{bmatrix} \right\}$$

$\varphi_n \in \{1, j, -1, -j\}$.

TABLE 29

Layout 1: Example 1B

| TPMI index | Precoder indicated by $(i_{1,1}, i_{1,2}, i_2)$ (Ordered from left to right in increasing order of TPMI index) | | | | | | | |
|---|---|---|---|---|---|---|---|---|
| 0-7   | (0, 0, 0) | (0, 0, 1) | (0, 0, 2) | (0, 0, 3) | (1, 0, 0) | (1, 0, 1) | (1, 0, 2) | (1, 0, 3) |
| 8-15  | (2, 0, 0) | (2, 0, 1) | (2, 0, 2) | (2, 0, 3) | (3, 0, 0) | (3, 0, 1) | (3, 0, 2) | (3, 0, 3) |
| 16-23 | (4, 0, 0) | (4, 0, 1) | (4, 0, 2) | (4, 0, 3) | (5, 0, 0) | (5, 0, 1) | (5, 0, 2) | (5, 0, 3) |
| 24-31 | (6, 0, 0) | (6, 0, 1) | (6, 0, 2) | (6, 0, 3) | (7, 0, 0) | (7, 0, 1) | (7, 0, 2) | (7, 0, 3) |

TABLE 30

Layout 1: Example 1C

| TPMI index | Precoder indicated by $(i_{1,1}, i_{1,2}, i_2)$ (Ordered from left to right in increasing order of TPMI index) | | | | | | | |
|---|---|---|---|---|---|---|---|---|
| 0-7  | (0, 0, 0) | (0, 0, 1) | (0, 0, 2) | (0, 0, 3) | (1, 0, 0) | (1, 0, 1) | (1, 0, 2) | (1, 0, 3) |
| 8-15 | (2, 0, 0) | (2, 0, 1) | (2, 0, 2) | (2, 0, 3) | (3, 0, 0) | (3, 0, 1) | (3, 0, 2) | (3, 0, 3) |

TABLE 31

Layout 2: Example 2C

| TPMI index | Precoder indicated by $(i_{1,1}, i_{1,2}, i_2)$ (Ordered from left to right in increasing order of TPMI index) | | | | | | | |
|---|---|---|---|---|---|---|---|---|
| 0-7   | (0, 0, 0) | (0, 0, 1) | (0, 0, 2) | (0, 0, 3) | (1, 0, 0) | (1, 0, 1) | (1, 0, 2) | (1, 0, 3) |
| 8-15  | (2, 0, 0) | (2, 0, 1) | (2, 0, 2) | (2, 0, 3) | (3, 0, 0) | (3, 0, 1) | (3, 0, 2) | (3, 0, 3) |
| 16-23 | (0, 1, 0) | (0, 1, 1) | (0, 1, 2) | (0, 1, 3) | (1, 1, 0) | (1, 1, 1) | (1, 1, 2) | (1, 1, 3) |
| 24-31 | (2, 1, 0) | (2, 1, 1) | (2, 1, 2) | (2, 1, 3) | (3, 1, 0) | (3, 1, 1) | (3, 1, 2) | (3, 1, 3) |

TABLE 32

Layout 2: Example 2D

| TPMI index | Precoder indicated by $(i_{1,1}, i_{1,2}, i_2)$ (Ordered from left to right in increasing order of TPMI index) | | | | | | | |
|---|---|---|---|---|---|---|---|---|
| 0-7  | (0, 0, 0) | (0, 0, 1) | (0, 0, 2) | (0, 0, 3) | (1, 0, 0) | (1, 0, 1) | (1, 0, 2) | (1, 0, 3) |
| 8-15 | (0, 1, 0) | (0, 1, 1) | (0, 1, 2) | (0, 1, 3) | (1, 1, 0) | (1, 1, 1) | (1, 1, 2) | (1, 1, 3) |

TABLE 33

Layout 1: Example 1C

| TPMI index | Precoder indicated by $(i_{1,1}, i_{1,2}, i_2)$ (Ordered from left to right in increasing order of TPMI index) |
|---|---|
| 0-7 | $\frac{1}{S}\begin{bmatrix}1\\1\\1\\1\\1\\1\\1\\1\end{bmatrix}$ $\frac{1}{S}\begin{bmatrix}1\\1\\1\\j\\j\\j\\j\end{bmatrix}$ $\frac{1}{S}\begin{bmatrix}1\\1\\1\\-1\\-1\\-1\\-1\end{bmatrix}$ $\frac{1}{S}\begin{bmatrix}1\\1\\1\\-j\\-j\\-j\\-j\end{bmatrix}$ $\frac{1}{S}\begin{bmatrix}1\\j\\-1\\-j\\1\\j\\-1\\-j\end{bmatrix}$ $\frac{1}{S}\begin{bmatrix}1\\j\\-1\\-j\\j\\-1\\-j\\1\end{bmatrix}$ $\frac{1}{S}\begin{bmatrix}1\\j\\-1\\-j\\-1\\-j\\1\\j\end{bmatrix}$ $\frac{1}{S}\begin{bmatrix}1\\j\\-1\\-j\\-j\\1\\j\\-1\end{bmatrix}$ |

TABLE 33-continued

Layout 1: Example 1C

| TPMI index | Precoder indicated by ($i_{1,1}$, $i_{1,2}$, $i_2$) (Ordered from left to right in increasing order of TPMI index) |
|---|---|
| 8-15 | $\frac{1}{S}\begin{bmatrix}1\\-1\\1\\-1\\1\\-1\\1\\-1\end{bmatrix}$ $\frac{1}{S}\begin{bmatrix}1\\-1\\1\\-1\\j\\-j\\j\\-j\end{bmatrix}$ $\frac{1}{S}\begin{bmatrix}1\\-1\\1\\-1\\-1\\1\\-1\\1\end{bmatrix}$ $\frac{1}{S}\begin{bmatrix}1\\-1\\1\\-1\\-j\\j\\-j\\j\end{bmatrix}$ $\frac{1}{S}\begin{bmatrix}1\\-j\\-1\\j\\1\\-j\\-1\\j\end{bmatrix}$ $\frac{1}{S}\begin{bmatrix}1\\-j\\-1\\j\\j\\1\\-j\\-1\end{bmatrix}$ $\frac{1}{S}\begin{bmatrix}1\\-j\\-1\\j\\-1\\j\\1\\-j\end{bmatrix}$ $\frac{1}{S}\begin{bmatrix}1\\-j\\-1\\j\\-j\\-1\\j\\1\end{bmatrix}$ |

TABLE 34

Layout 2: Example 2D

| TPMI index | Precoder indicated by ($i_{1,1}$, $i_{1,2}$, $i_2$) (Ordered from left to right in increasing order of TPMI index) |
|---|---|
| 0-7 | $\frac{1}{S}\begin{bmatrix}1\\1\\1\\1\\1\\1\\1\\1\end{bmatrix}$ $\frac{1}{S}\begin{bmatrix}1\\1\\1\\1\\j\\j\\j\\j\end{bmatrix}$ $\frac{1}{S}\begin{bmatrix}1\\1\\1\\1\\-1\\-1\\-1\\-1\end{bmatrix}$ $\frac{1}{S}\begin{bmatrix}1\\1\\1\\1\\-j\\-j\\-j\\-j\end{bmatrix}$ $\frac{1}{S}\begin{bmatrix}1\\1\\-1\\-1\\1\\1\\-1\\-1\end{bmatrix}$ $\frac{1}{S}\begin{bmatrix}1\\1\\-1\\-1\\j\\j\\-j\\-j\end{bmatrix}$ $\frac{1}{S}\begin{bmatrix}1\\1\\-1\\-1\\-1\\-1\\1\\1\end{bmatrix}$ $\frac{1}{S}\begin{bmatrix}1\\1\\-1\\-1\\-j\\-j\\j\\j\end{bmatrix}$ |
| 8-15 | $\frac{1}{S}\begin{bmatrix}1\\-1\\1\\-1\\1\\-1\\1\\-1\end{bmatrix}$ $\frac{1}{S}\begin{bmatrix}1\\-1\\1\\-1\\j\\-j\\j\\-j\end{bmatrix}$ $\frac{1}{S}\begin{bmatrix}1\\-1\\1\\-1\\-1\\1\\-1\\1\end{bmatrix}$ $\frac{1}{S}\begin{bmatrix}1\\-1\\1\\-1\\-j\\j\\-j\\j\end{bmatrix}$ $\frac{1}{S}\begin{bmatrix}1\\-1\\-1\\1\\1\\-1\\-1\\1\end{bmatrix}$ $\frac{1}{S}\begin{bmatrix}1\\-1\\-1\\1\\j\\-j\\-j\\j\end{bmatrix}$ $\frac{1}{S}\begin{bmatrix}1\\-1\\-1\\1\\-1\\1\\1\\-1\end{bmatrix}$ $\frac{1}{S}\begin{bmatrix}1\\-1\\-1\\1\\-j\\j\\j\\-j\end{bmatrix}$ |

In one embodiment, the UL codebook includes partial-coherent (PC) precoding matrices, and a PC precoding matrix can be defined as a matrix who's each column comprises both zero and non-zero entities, e.g., at least two non-zero and remaining zero elements/entries in each column.

In one example, the PC precoding matrices can be parameterized as follows. A given number of antenna ports P can be divided into groups or subsets of partial ports. Let a triple ($M_g$, $n_1$, $n_2$) indicate $M_g$ groups/subsets each with layout ($n_1$, $n_2$). Then, a given number of antenna ports P can be divided into groups or subsets of partial ports that can be expressed as one or a combination of multiple ($M_g$, $n_1$, $n_2$). Two examples are illustrated in Table 35 and Table 36. A layer of the PUSCH transmission is transmitted from k groups, where $1 \leq k < N_g$. In one example, the notation $M_g$ is replaced with $N_g$ or vice versa.

Each column (layer) of a PC precoding matrix comprises two components: (A) selection of a group (subset) of ports which corresponds to non-zero entries of the column, and (B) a precoder for the selected ports, which corresponds to the values of non-zero entries of the column.

In particular, for rank 1, a group or subset of ports is selected, and the rank 1 codebook is used for the selected ports. In one example, all rank 1 precoders (from the DL Type I codebook) are included in the codebook. In one example, a subset of rank 1 precoders (from the DL Type I codebook) is included in the codebook.

For rank 2, there can be two types precoding matrices:

Type 1: a group or subset of ports is selected, and the rank 2 codebook is used for the selected ports. In one example, all rank 2 precoders (from the DL Type I codebook) are included in the codebook. In one example, a subset of rank 2 precoders (from the DL Type I codebook) is included in the codebook.

Type 2: two groups or subsets of ports are selected, and the groups are disjoint, don't have any common ports. For each group, the rank 1 codebook is used for the selected ports comprising the group.

In one example, all rank 1 precoders (from the DL Type I codebook) are included in the codebook. In one example, a subset of rank 1 precoders (from the DL Type I codebook) is included in the codebook.

For rank 3, there can be three types precoding matrices:

Type 1: a group or subset of ports is selected, and the rank 3 codebook is used for the selected ports. In one example, all rank 3 precoders (from the DL Type I codebook) are included in the codebook. In one example, a subset of rank 3 precoders (from the DL Type I codebook) is included in the codebook.

Type 2: two groups or subsets of ports are selected, and the groups are disjoint, don't have any common ports.

For 1st selected group, the rank 1 codebook is used for the selected ports comprising the group, and for the 2nd selected group, the rank 2 codebook is used for the selected ports comprising the group. In one example, for each selected group, all rank 1 or 2 precoders (from the DL Type I codebook) are included in the codebook. In one example, for each selected group, a subset of rank 1 or 2 precoders (from the DL Type I codebook) is included in the codebook.

Type 3: three groups or subsets of ports are selected, and the groups are disjoint, don't have any common ports. For each group,
   the rank 1 codebook is used for the selected ports comprising the group.
   In one example, all rank 1 precoders (from the DL Type I codebook) are included in the codebook. In one example, a subset of rank 1 precoders (from the DL Type I codebook) is included in the codebook.

For rank >=4, the rank 3 types can be extended in a straightforward manner.

TABLE 35

| Number of antenna ports | Partial ports | |
|---|---|---|
| | Number of partial ports | Port lay-out: $(M_g, n_1, n_2)$ |
| 4 ports | 2 + 2 | (2, 1, 1) |
| 6 ports | 2 + 2 + 2 | (3, 1, 1) |
| | 4 + 2 | (1, 2, 1) + (1, 1, 1) |
| 8 ports | 2 + 2 + 2 + 2 | (4, 1, 1) |
| | 4 + 2 + 2 | (1, 2, 1) + (2, 1, 1) |
| | 4 + 4 | (2, 2, 1) |
| | 6 + 2 | (1, 3, 1) + (1, 1, 1) |
| 12 ports | 2 + 2 + 2 + 2 + 2 + 2 | (6, 1, 1) |
| | 4 + 2 + 2 + 2 + 2 | (1, 2, 1) + (4, 1, 1) |
| | 4 + 4 + 2 + 2 | (2, 2, 1) + (2, 1, 1) |
| | 4 + 4 + 4 | (3, 2, 1) |
| | 6 + 2 + 2 + 2 | (1, 3, 1) + (3, 1, 1) |
| | 6 + 4 + 2 | (1, 3, 1) + (1, 2, 1) + (1, 1, 1) |
| | 6 + 6 | (2, 3, 1) |
| | 8 + 2 + 2 | (1, 4, 1) or (1, 2, 2) + (2, 1, 1) |
| | 8 + 4 | (1, 4, 1) or (1, 2, 2) + (1, 2, 1) |

TABLE 36

| Number of antenna ports | Partial ports | |
|---|---|---|
| | Number of partial ports | Port lay-out: $(M_p, N_{1,p}, N_{2,p})$ |
| 4 ports | 2 + 2 | (2, 1, 1) |
| 6 ports | 2 + 2 + 2 | (3, 1, 1) |
| | 4 + 2 | (1, 2, 1) + (1, 1, 1) |
| 8 ports | 2 + 2 + 2 + 2 | (4, 1, 1) |
| | 4 + 2 + 2 | (1, 2, 1) + (2, 1, 1) |
| | 4 + 4 | (2, 2, 1) |
| 12 ports | 2 + 2 + 2 + 2 + 2 + 2 | (6, 1, 1) |
| | 4 + 2 + 2 + 2 + 2 | (1, 2, 1) + (4, 1, 1) |
| | 4 + 4 + 2 + 2 | (2, 2, 1) + (2, 1, 1) |
| | 4 + 4 + 4 | (3, 2, 1) |
| 16 ports | 2 + 2 + 2 + 2 + 2 + 2 + 2 + 2 | (8, 1, 1) |
| | 4 + 2 + 2 + 2 + 2 + 2 + 2 | (1, 2, 1) + (6, 1, 1) |
| | 4 + 4 + 2 + 2 + 2 + 2 | (2, 2, 1) + (4, 1, 1) |
| | 4 + 4 + 4 + 2 + 2 | (3, 2, 1) + (2, 1, 1) |
| | 4 + 4 + 4 + 4 | (4, 2, 1) |

In one embodiment, the UL codebook includes non-coherent (FC) precoding matrices, and a NC precoding matrix can be defined as a matrix whose each column is a selection vector comprising one non-zero and remaining zero elements/entries. Let $e_i^{(P)}$, i=1, ..., P indicate a length P selection vector whose i-th element is 1 and the rest are zero. Then, for rank 1, there are $$\binom{P}{1} = P$$

precoders $e_{i_1}^{(P)}$, each selecting a port $i_1 \in \{1, \ldots, P\}$ for a layer; for rank 2, there are $$\binom{P}{2}$$

precoding matrices $[e_{i_1}^{(P)}, e_{i_2}^{(P)}]$, each selecting two ports $i_1, i_2 \in \{1, \ldots, P\}$ for two layers; and in general for rank r, there are $$\binom{P}{r}$$

precoding matrices $[e_{i_1}^{(P)}, e_{i_2}^{(P)}]$, each selecting r ports $i_1, \ldots, i_r \in \{1, \ldots, P\}$ for r layers.

In one example, the port selection is unrestricted and free, and the UL codebook includes all NC precoding matrices for all rank.

In one example, the port selection is restricted, and the UL codebook includes a subset of all NC precoding matrices. For example, the subset includes precoding matrices such that the selected ports are consecutive $i_1=k$, $i_2=k+1$, $i_3=k+2, \ldots$. Or the subset includes precoding matrices such that the selected ports are uniformly space $i_1=k$, $i_2=k+d$, $i_3=k+2d, \ldots$, where d is the spacing which can be fixed or configured (e.g., via higher layer), or reported by the UE.

In one example, the port selection is unrestricted and free according to an example described above for rank values in set $R_1$ and restricted according to another example described above for rank values in set $R_2$. In one example, $R_1=1$ and $R_2=\{2,3, \ldots\}$.

In one embodiment, the rank >=2 UL codebook includes mixed coherent precoding matrices, which are defined as precoding matrices having columns (layers) corresponding to different coherent types. For example,
   Rank 2: (layer 1, layer 2)=(FC, PC), i.e., layer 1 is a FC precoder and layer 2 is a PC precoder.
   Rank 2: (layer 1, layer 2)=(PC, NC), i.e., layer 1 is a PC precoder and layer 2 is a NC precoder.
   Rank 3: (layer 1, layer 2, layer 3)=(PC, NC, NC), i.e., layer 1 is a PC precoder and layers 2 and 3 are PC precoders.

In one embodiment, the UL codebook for >4 or >4 antenna ports is determined/configured according to at least one of the following examples.

In one example, the UL codebook for >4 or >4 antenna ports includes precoding matrices with only coherence type (from FC, PC, and NC).

In one example, the UL codebook for >4 or >4 antenna ports includes only FC precoding matrices for all rank values.

In one example, the UL codebook for >4 or >4 antenna ports includes only FC precoding matrices for rank values in set $R_1$. In one example, $R_1=\{1,2\}$ or $\{1,2,3\}$.

In one example, the UL codebook for >4 or >4 antenna ports includes only PC precoding matrices for all rank values.

In one example, the UL codebook for >4 or >4 antenna ports includes only PC precoding matrices for rank values in set $R_1$. In one example, $R_1=\{3,4\}$ or $\{4, \ldots\}$.

In one example, the UL codebook for >4 or >4 antenna ports includes only NC precoding matrices for all rank values.

In one example, the UL codebook for >4 or >4 antenna ports includes only NC precoding matrices for rank values in set $R_1$. In one example, $R_1=\{3,4\}$ or $\{4,\ldots\}$.

In one example, the UL codebook for >4 or >4 antenna ports includes precoding matrices with two coherence types (from FC, PC, and NC).

In one example, the UL codebook for >4 or >4 antenna ports includes both FC and PC precoding matrices for all rank values.

In one example, the UL codebook for >4 or >4 antenna ports includes both FC and PC precoding matrices for rank values in set $R_1$. In one example, $R_1=\{1,2\}$ or $\{1,2,3\}$.

In one example, the UL codebook for >4 or >4 antenna ports includes both FC and NC precoding matrices for all rank values.

In one example, the UL codebook for >4 or >4 antenna ports includes both FC and NC precoding matrices for rank values in set $R_1$. In one example, $R_1=\{1,2\}$ or $\{1,2,3\}$.

In one example, the UL codebook for >4 or >4 antenna ports includes both PC and NC precoding matrices for all rank values.

In one example, the UL codebook for >4 or >4 antenna ports includes both PC and NC precoding matrices for rank values in set $R_1$. In one example, $R_1=\{3,4\}$ or $\{4,\ldots\}$.

In one example, the UL codebook for >4 or >4 antenna ports includes precoding matrices with any coherence types (from FC, PC, and NC).

In one example, the UL codebook for >4 or >4 antenna ports includes FC and PC and NC precoding matrices for all rank values.

In one example, the UL codebook for >4 or >4 antenna ports includes FC and PC and NC precoding matrices for rank values in set $R_1$. In one example, $R_1=\{1,2\}$ or $\{1,2,3\}$.

In one example, whether the UE codebook for >4 or >4 antenna ports includes precoding matrices with only one or two or three coherence types is configured to the UE (e.g., via higher layer parameter codebookSubset).

In one example, the UE reports its coherence capability via UE capability reporting. And whether the UE codebook for >4 or >4 antenna ports includes precoding matrices with only one or two or three coherence types is configured to the UE (e.g., via higher layer parameter codebookSubset) subject to (or conditioned on) the coherence capability of the UE.

In one example, when the UE reports its coherence capability as NC, then the UE codebook for ≥4 or >4 antenna ports includes precoding matrices with only NC coherence type. That is, the higher layer parameter (codebookSubset) can only configure the UL codebook with NC precoding matrices.

In one example, when the UE reports its coherence capability as PC, then the UE codebook for ≥4 or >4 antenna ports includes precoding matrices with PC and/or NC coherence types. That is, the higher layer parameter (codebookSubset) can configure the UL codebook with NC or PC or PC+NC precoding matrices.

In one example, when the UE reports its coherence capability as FC, then the UE codebook for ≥4 or >4 antenna ports includes precoding matrices with FC and/or PC and/or NC coherence types. That is, the higher layer parameter (codebookSubset) can configure the UL codebook with NC or PC or FC or PC+NC or FC+NC or FC+PC or FC+PC+NC precoding matrices.

In one embodiment, the UL codebook for P>4 antenna ports include codebooks for rank $1, \ldots, R_{max}$, where $R_{max}$ is the maximum rank (or number of layers) value.

In one example, $R_{max}=4$ regardless of the value of P>4.

In one example, $R_{max}$ depends on the value of P>4. For example, $R_{max}=4$ for P=6 or 8, and $R_{max}=8$ for P>8 (e.g., P=12 or 16). Or $R_{max}=P$.

In one example, $R_{max}$ is subject to (conditioned on) the UE capability reporting. For example, the UE can report via its capability reporting whether it supports $R_{max}>r$, where r can be fixed (e.g., r=2 or 4) or r is also reported via the UE capability reporting.

In one example, $R_{max}$ is configured, for example, via higher layer parameter (e.g., maxRank in PUSCH-Config). This configuration can be subject to (conditioned on) the UE capability reporting, as described above.

In one embodiment, the precoder scaling s is such that the power (amplitude square) for each antenna port (antenna ports corresponds to rows of a precoding matrix) is fixed (doesn't change) across different precoding matrices in the codebook. Such precoder scaling can help avoid changing the power of UE's power amplifier (PA) that is connected to an antenna port.

In one example, $$s = \frac{1}{\sqrt{P}}$$

for PC or NC precoding matrices. Hence, $$s = \frac{1}{\sqrt{6}} \text{ and } s = \frac{1}{2\sqrt{2}}$$

for 6 and 8 antenna ports.

In one example, $$s = \frac{\sqrt{v}}{\sqrt{P}}$$

for FC precoding matrices where v is the rank value. Hence $$s = \frac{1}{\sqrt{6}}, \frac{1}{\sqrt{3}}, \frac{1}{\sqrt{2}}, \frac{\sqrt{2}}{\sqrt{3}}, \frac{\sqrt{5}}{\sqrt{6}},$$

1 for 6 antenna ports and v=1, ..., 6, respectively; and $$s = \frac{1}{2\sqrt{2}}, \frac{1}{2}, \frac{\sqrt{3}}{2\sqrt{2}}, \frac{1}{\sqrt{2}}, \frac{\sqrt{5}}{2\sqrt{2}}, \frac{\sqrt{3}}{2}, \frac{\sqrt{7}}{2\sqrt{2}},$$

1 for 8 antenna ports and v=1, ..., 8, respectively.

In one example, $$s = \frac{\sqrt{K_{NZ,row}}}{\sqrt{P}},$$

where $K_{Nz,row}$ is the number of non-zero entries in a row (which is associated with a port). If two rows have different number of non-zero entries, then $K_{Nz,row}$ can be the minimum or the maximum of $K_{Nz,row}$ values across all rows.
In one example, $$s = \frac{1}{\sqrt{K_{NZ,tot}}},$$

where $K_{NZ,tot}$ is the total number of non-zero entries in the precoding matrix.

Note that, the total power (summed across all powers) of a precoding matric may not be equal to 1 (i.e., will be less than 1) for some precoding matrices (e.g., rank 1 PC or NC precoding matrices). Such precoding matrices can be referred to non-full-power, and precoding matrices whose power equal 1 can be referred to as full-power.

In one example, the precoder scaling s is configured to the UE (e.g., via higher layer), and depending on the configuration, the precoding matrices can be full-power or non-full-power.

In one example, the precoder scaling s is reported by the UE (e.g., via UE capability reporting), and depending on the UE capability, the precoding matrices can be full-power or non-full-power.

In one embodiment, the UL codebook for P>4 or P>4 antenna ports is determined based on the (Rel. 15 NR) UL codebooks for 2 and/or 4 antenna ports. For example, K precoding matrices from UL codebooks for 2 or 4 antenna ports can be concatenated to obtain precoding matrices for P>4 antenna ports. In one example, the UL codebook for 8 antenna ports includes precoding matrices determined based on an UL codebook for M E {2,4} antenna ports; when M=4, the indication (indicating a precoding matrix for 8 antenna ports) indicates two precoding matrices ($W_1$ and $W_2$) from the UL codebook for 4 antenna ports, and when M=2, the indication indicates four precoding matrices ($W_1 \ldots W_4$) from the UL codebook for 2 antenna ports.

In one example, when M=4, the indication also indicates a co-phase ($c_{1,l}$) for each layer 1, and the l-th layer of a precoding matrix for 8 antenna ports is given by $$\begin{bmatrix} w_{1,l} \\ c_{1,l}w_{2,l} \end{bmatrix},$$

and when M=2, the indication indicates three co-phase values ($c_{1,l}$, $c_{2,l}$, $c_{3,l}$) for each layer 1 and the l-th layer of a precoding matrix for 8 antenna ports is given by $$\begin{bmatrix} w_{1,l} \\ c_{1,l}w_{2,l} \\ c_{2,l}w_{3,l} \\ c_{3,l}w_{4,l} \end{bmatrix},$$

where $w_{l,1}$ is the l-th column of $W_1$.

TABLE 37

| | Example I.8.1 | Example I.8.2 | Example I.8.2A | Example I.8.3 | Example I.8.4 |
|---|---|---|---|---|---|
| P | ($P_1$, $P_2$) | ($P_1$, $P_2$, $P_3$) | ($P_1$, ..., $P_4$) | ($P_1$, ..., $P_K$) | ($P_1$, ..., $P_K$) |
| 4 | (2, 2) | — | | (2, 2) | (2, 2) |
| 6 | (4, 2) | (2, 2, 2) | | (2, 2, 2), (4, 2) | (2, 2, 2), (4, 2) |
| 8 | (4, 4) | (4, 2, 2) | (2, 2, 2, 2) | (4, 2, 2), (4, 4) | (2, 2, 2, 2), (4, 2, 2), (4, 4) |

In one example, $P=P_1+P_2$ where $P_k$ E {2,4}. The $P_k$ values for different values of P are shown in Table 37.

In one example, there is a single joint TPMI indicates a pair of indices ($I_1$, $I_2$), where for k=1, 2, index $I_k$ indicates a precoding matrix from the Rel. 15 NR UL codebook for $P_k$ antenna ports.

In one example, there are two separate TPMIs, $I_1$, $I_2$, where for k=1, 2, TPMI $I_k$ indicates a precoding matrix from the UL codebook for $P_k$ antenna ports.

In addition, a co-phasing factor $c_1$ can also be included across the two precoding matrices $w_1$ and $w_2$ indicated by $I_1$ and $I_2$ respectively, i.e., the precoding matrix for P ports is given by $$\begin{bmatrix} w_1 \\ c_1 w_2 \end{bmatrix}.$$

When the number of layers or rank (v)>1, $c_1 = [c_{1,1}, \ldots, c_{1,v}]$, where $c_{1,l}$ is a co-phase for layer 1, the l-th layer of a precoding matrix for 8 antenna ports is given by $$\begin{bmatrix} w_{1,l} \\ c_{1,l}w_{2,l} \end{bmatrix},$$

where $w_{l,1}$ is the l-th column of $w_l$.

In one example, the co-phasing factor $c_1$ is indicated via an indicator $J_1$ which can be separate from the joint TPMI or can be included in the joint TPMI as ($I_1, I_2, J_1$). Or $J_1$ can be indicated jointly with $I_1$ or $I_2$.

In one example, the payload (number of bits) of $J_1$ is $K_1$ bits, where $K_1$=1 or 2. In one example, when $K_1$=1, $I_1$ indicates a co-phase value from BPSK alphabet $$\{1, -1\} \text{ or } e^{\frac{j\pi}{n}},$$

where n=0,1. In one example, when $K_1$=2, $I_1$ indicates a co-phase value from QPSK alphabet $$\{1, j, -1, -j\} \text{ or } e^{\frac{j\pi}{n}},$$

where n=0,1,2,3.

In one example, when $P_1 = P_2$, the two indicators or TPMIs $I_1$, $I_2$ can be associated with the same UL codebook or two different codebooks, where same or different codebooks are determined based on the Rel. 15 UL codebook for $P_1$ ports. Regardless of the same or different codebooks, the values two indicators or TPMIs $I_1$, $I_2$ are independent.

In one example, the $I_k$ can be indicated from either the entire Rel. 15 UL codebook for $P_k$ ports, or from a subset of Rel. 15 UL codebook for $P_k$ ports, where the subset corresponds to selecting a subset of precoding matrices from the Rel. 15 NR UL codebook.

In one example, $P=P_1+P_2+P_3$ where $P_k \in \{2,4\}$. The $P_k$ values for different values of P are shown in Table 37.

In one example, there is a single joint TPMI indicates a pair of indices $(I_1, I_2, I_3)$, where for k=1,2,3, index $I_k$ indicates a precoding matrix from the Rel. 15 NR UL codebook for $P_k$ antenna ports.

In one example, there are three separate TPMIs, $I_1, I_2, I_3$ where for k=1,2,3, TPMI $I_k$ indicates a precoding matrix from the UL codebook for $P_k$ antenna ports.

In addition, two co-phasing factors $c_1$, $c_2$ can also be included across the two pairs of precoding matrices $(w_1, w_2)$ and $(w_1, w_3)$, where $w_k$ is indicated by $I_k$, i.e., the precoding matrix for P ports is given by $$\begin{bmatrix} w_1 \\ c_1 w_2 \\ c_2 w_3 \end{bmatrix}.$$

In one example, the co-phasing factor $c_k$ is indicated via a separate indicator $J_k$ which can be separate from the joint TPMI or can be included in the joint TPMI as $(I_1, I_2, I_3, J_1, J_2)$. Or $J_k$ can be indicated jointly with $I_{k+1}$ In one example, the co-phasing factors $c_1$ and $c_2$ are indicated via a joint indicator J which can be separate from the joint TPMI or can be included in the joint TPMI as $(I_1, I_2, I_3, J)$. Or J can be indicated jointly with $I_2$ or $I_3$.

In one example, the payload (number of bits) of $J_k$ is $K_k$ bits, where $K_k=1$ or 2. In one example, when $K_k=1$, $J_k$ indicates a co-phase value from BPSK alphabet $\{1, -1\}$ or $$e^{\frac{j\pi}{n}},$$

where n=0,1. In one example, when $K_1=2, I_1$ indicates a co-phase value from QPSK alphabet $\{1, j, -1, -j\}$ or $$e^{\frac{j\pi}{n}},$$

where n=0,1,2,3.

In one example, when $P_1=P_2=P_3$, the three indicators or TPMIs $I_1, I_2, I_3$ can be associated with the same UL codebook or two different codebooks, where same or different codebooks are determined based on the Rel. 15 UL codebook for $P_1$ ports. Regardless of the same or different codebooks, the values three indicators or TPMIs $I_1, I_2, I_3$ are independent.

In one example, the $I_k$ can be indicated from either the entire Rel. 15 UL codebook for $P_k$ ports, or from a subset of Rel. 15 UL codebook for $P_k$ ports, where the subset corresponds to selecting a subset of precoding matrices from the Rel. 15 NR UL codebook.

In one example, $P=\Sigma_{k=1}^{L} P_k$ where $L \in \{2,3\}$ and $P_k \in \{2, 4\}$. The $P_k$ values for different values of P are shown in Table 27. When L=2, the details are according to an example described above, and when L=3, the details are according to another example shown in Table 27 described above.

In one example, $P=\Sigma_{k=1}^{L} P_k$ where $L \in \{2,3,4\}$ and $P_k \in \{2,4\}$. The $P_k$ values for different values of P are shown in Table 37. When L=2, the details are according to an example described above; when L=3, the details are according to another example shown in Table 27 described above; when L=4, the details are according to the straightforward extension of one of the examples shown in Table 37 described above to L=4.

Any of the above variation embodiments can be utilized independently or in combination with at least one other variation embodiment.

Figure 11:
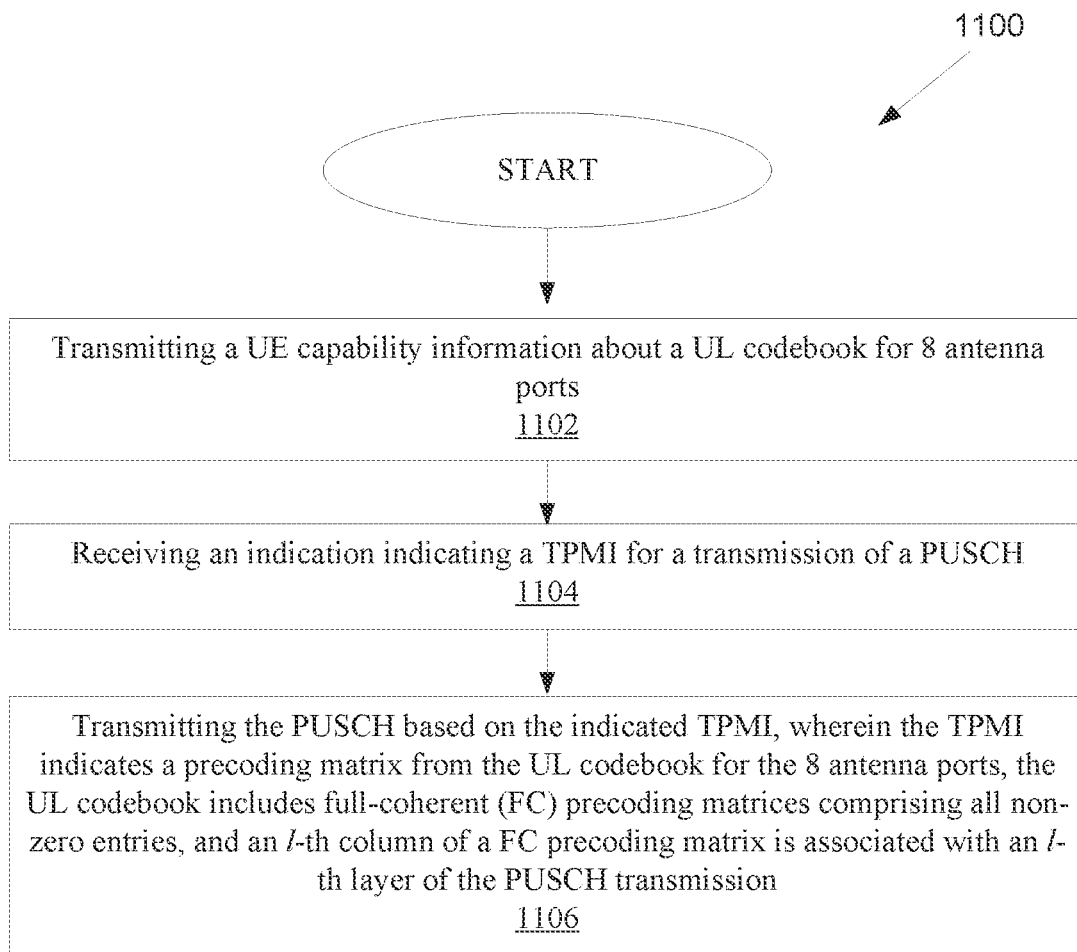
FIG. 11 illustrates a flowchart of a method for operating a UE according to embodiments of the present disclosure.

FIG. 11 illustrates a flow chart of a method 1100 for operating a user equipment (UE), as may be performed by a UE such as UE 116, according to embodiments of the present disclosure. The embodiment of the method 1100 illustrated in FIG. 11 is for illustration only. FIG. 11 does not limit the scope of this disclosure to any particular implementation.

As illustrated in FIG. 11, the method 1100 begins at step 1102. In step 1102, the UE (e.g., 111-116 as illustrated in FIG. 1) transmits a UE capability information about a UL codebook for 8 antenna ports.

In step 1104, the UE receives an indication indicating a TPMI for a transmission of a PUSCH.

In step 1106, the UE transmits the PUSCH based on the indicated TPMI, wherein the TPMI indicates a precoding matrix from the UL codebook for the 8 antenna ports, the UL codebook includes FC precoding matrices comprising all non-zero entries, and an l-th column of a FC precoding matrix is associated with an l-th layer of the PUSCH transmission, and is given by $$W_{l,m,n}^{(l)} = \frac{1}{s} \begin{bmatrix} v_{l,m} \\ \varphi_n v_{l,m} \end{bmatrix}, v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T,$$

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}, \varphi_n = e^{j\pi n/2},$$

wherein: $l \in \{1, \ldots, v\}$ and v is a number of layers of the PUSCH transmission, $N_1$ and $N_2$ are number of antenna ports with the same polarization in first and second dimensions, respectively, $O_1$ and $O_2$ are oversampling factors in the first and second dimensions, respectively, and S is a scaling factor In one embodiment, $(N_1, N_2)=(4,1)$ or $(2,2)$, and $S=\sqrt{2N_1 N_2}=2\sqrt{2}$.

In one embodiment, $(O_1, O_2)=(1,1), (2,1)$ or $(2,2)$.

In one embodiment, wherein when $(N_1, N_2)=(4,1)$, the UL codebook for 1 layer includes all of or a subset of the following:

$$\frac{1}{S}\begin{bmatrix}1\\1\\1\\1\\1\\1\\1\\1\end{bmatrix}, \frac{1}{S}\begin{bmatrix}1\\1\\1\\1\\j\\j\\j\\j\end{bmatrix}, \frac{1}{S}\begin{bmatrix}1\\1\\-1\\-1\\1\\1\\-1\\-1\end{bmatrix}, \frac{1}{S}\begin{bmatrix}1\\1\\-1\\-1\\j\\j\\-j\\-j\end{bmatrix}, \frac{1}{S}\begin{bmatrix}1\\j\\-1\\-j\\1\\j\\-1\\-j\end{bmatrix}, \frac{1}{S}\begin{bmatrix}1\\j\\-1\\-j\\j\\-1\\-j\\1\end{bmatrix}, \frac{1}{S}\begin{bmatrix}1\\j\\-1\\-j\\-1\\-j\\1\\j\end{bmatrix}, \frac{1}{S}\begin{bmatrix}1\\j\\-1\\-j\\-j\\1\\j\\-1\end{bmatrix},$$

$$\frac{1}{S}\begin{bmatrix}1\\-1\\1\\-1\\1\\-1\\1\\-1\end{bmatrix}, \frac{1}{S}\begin{bmatrix}1\\-1\\1\\-1\\j\\-j\\j\\-j\end{bmatrix}, \frac{1}{S}\begin{bmatrix}1\\-1\\-1\\1\\1\\-1\\-1\\1\end{bmatrix}, \frac{1}{S}\begin{bmatrix}1\\-1\\-1\\1\\j\\-j\\-j\\j\end{bmatrix}, \frac{1}{S}\begin{bmatrix}1\\-j\\-1\\j\\1\\-j\\-1\\j\end{bmatrix}, \frac{1}{S}\begin{bmatrix}1\\-j\\-1\\j\\j\\1\\-j\\-1\end{bmatrix}, \frac{1}{S}\begin{bmatrix}1\\-j\\-1\\j\\-1\\j\\1\\-j\end{bmatrix}, \frac{1}{S}\begin{bmatrix}1\\-j\\-1\\j\\-j\\-1\\j\\1\end{bmatrix}$$

which are determined based on $$v_{l,m} \in \left\{ \begin{bmatrix} 1 \\ 1 \\ 1 \\ 1 \end{bmatrix}, \begin{bmatrix} 1 \\ j \\ -1 \\ -j \end{bmatrix}, \begin{bmatrix} 1 \\ -1 \\ 1 \\ -1 \end{bmatrix}, \begin{bmatrix} 1 \\ -j \\ -1 \\ j \end{bmatrix} \right\}$$

and $\varphi_n \in \{1, j, -1, -j\}$; and when $(N_1, N_2) = (2,2)$, the UL codebook for 1 layer includes all of or a subset of the following:

$$\frac{1}{S}\begin{bmatrix}1\\1\\1\\1\\1\\1\\1\\1\end{bmatrix}, \frac{1}{S}\begin{bmatrix}1\\1\\1\\1\\j\\j\\j\\j\end{bmatrix}, \frac{1}{S}\begin{bmatrix}1\\1\\1\\1\\-1\\-1\\-1\\-1\end{bmatrix}, \frac{1}{S}\begin{bmatrix}1\\1\\1\\1\\-j\\-j\\-j\\-j\end{bmatrix}, \frac{1}{S}\begin{bmatrix}1\\1\\-1\\-1\\1\\1\\-1\\-1\end{bmatrix}, \frac{1}{S}\begin{bmatrix}1\\1\\-1\\-1\\j\\j\\-j\\-j\end{bmatrix}, \frac{1}{S}\begin{bmatrix}1\\1\\-1\\-1\\-1\\-1\\1\\1\end{bmatrix}, \frac{1}{S}\begin{bmatrix}1\\1\\-1\\-1\\-j\\-j\\j\\j\end{bmatrix},$$

$$\frac{1}{S}\begin{bmatrix}1\\-1\\1\\-1\\1\\-1\\1\\-1\end{bmatrix}, \frac{1}{S}\begin{bmatrix}1\\-1\\1\\-1\\j\\-j\\j\\-j\end{bmatrix}, \frac{1}{S}\begin{bmatrix}1\\-1\\1\\-1\\-1\\1\\-1\\1\end{bmatrix}, \frac{1}{S}\begin{bmatrix}1\\-1\\1\\-1\\-j\\j\\-j\\j\end{bmatrix}, \frac{1}{S}\begin{bmatrix}1\\-1\\-1\\1\\1\\-1\\-1\\1\end{bmatrix}, \frac{1}{S}\begin{bmatrix}1\\-1\\-1\\1\\j\\-j\\-j\\j\end{bmatrix}, \frac{1}{S}\begin{bmatrix}1\\-1\\-1\\1\\-1\\1\\1\\-1\end{bmatrix}, \frac{1}{S}\begin{bmatrix}1\\-1\\-1\\1\\-j\\j\\j\\-j\end{bmatrix}$$

which are determined based on $$v_{l,m} \in \left\{ \begin{bmatrix} 1 \\ 1 \\ 1 \\ 1 \end{bmatrix}, \begin{bmatrix} 1 \\ 1 \\ -1 \\ -1 \end{bmatrix}, \begin{bmatrix} 1 \\ -1 \\ 1 \\ -1 \end{bmatrix}, \begin{bmatrix} 1 \\ -1 \\ -1 \\ 1 \end{bmatrix} \right\}$$

and $\varphi_n \in \{1, j, -1, -j\}$.

In one embodiment, the UL codebook for 8 antenna ports includes partial coherent (PC) precoding matrices comprising both zero and non-zero entries in each column, the PC precoding matrices are obtained by partitioning the 8 antenna ports into $N_g$ groups, each group comprising $(n_1, n_2)$ antenna ports with the same polarization in the first and second dimensions, respectively, where $(N_g, n_1, n_2) = (2,2,1)$ or $(4,1,1)$, and a layer of the PUSCH transmission is transmitted from k groups, where $1 \leq k < N_g$.

In one embodiment, the UL codebook for 8 antenna ports includes precoding matrices determined based on an UL codebook for $M \in \{2,4\}$ antenna ports, when M=4, the indication indicates two precoding matrices ($W_1$ and $W_2$) from the UL codebook for 4 antenna ports, and when M=2, the indication indicates four precoding matrices ($W_1 \ldots W_4$) from the UL codebook for 2 antenna ports.

In one embodiment, when M=4, the indication indicates a co-phase ($c_{1,l}$) for each layer l, and the l-th layer of a precoding matrix for 8 antenna ports is given by $$\begin{bmatrix} w_{1,l} \\ c_{1,l} w_{2,l} \end{bmatrix},$$

and when M=2, the indication indicates three co-phase values ($c_{1,l}, c_{2,l}, c_{3,l}$) for each layer l and the l-th layer of a precoding matrix for 8 antenna ports is given by $$\begin{bmatrix} w_{1,l} \\ c_{1,l} w_{2,l} \\ c_{2,l} w_{3,l} \\ c_{3,l} w_{4,l} \end{bmatrix},$$

where $w_{i,l}$ is the l-th column of $W_i$.

In one embodiment, the UE capability information includes an information whether the UE supports more than 4 layers of the PUSCH transmission.

Figure 12:
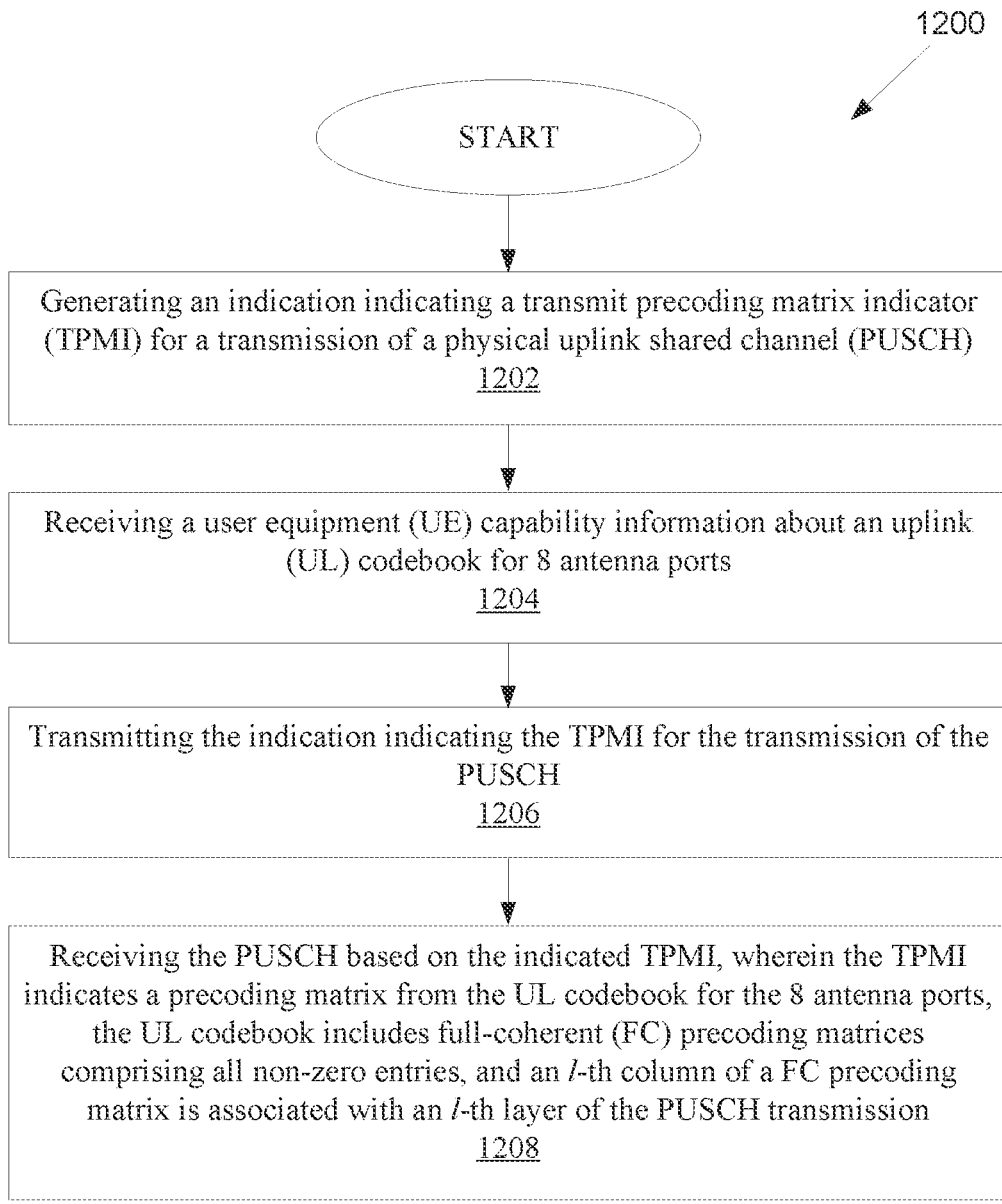
FIG. 12 illustrates a flowchart of a method for operating a BS according to embodiments of the present disclosure.

FIG. 12 illustrates a flow chart of another method 1200, as may be performed by a base station (BS) such as BS 102, according to embodiments of the present disclosure. The embodiment of the method 1200 illustrated in FIG. 12 is for illustration only. FIG. 12 does not limit the scope of this disclosure to any particular implementation.

As illustrated in FIG. 12, the method 1200 begins at step 1202. In step 1202, the BS (e.g., 101-103 as illustrated in FIG. 1), generates an indication indicating a TPMI for a transmission of a PUSCH.

In step 1204, the BS receives a user equipment (UE) capability information about an uplink (UL) codebook for 8 antenna ports.

In step 1206, the BS transmits the indication indicating the TPMI for the transmission of the PUSCH.

In step 1208, the BS receives the PUSCH based on the indicated TPMI, wherein the TPMI indicates a precoding matrix from the UL codebook for the 8 antenna ports, the UL codebook includes FC precoding matrices comprising all non-zero entries, and an l-th column of a FC precoding matrix is associated with an l-th layer of the PUSCH transmission, and is given by $$W^{(l)}_{l,m,n} = \frac{1}{s}\begin{bmatrix} v_{l,m} \\ \varphi_n v_{l,m} \end{bmatrix}, v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T,$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}, \varphi_n = e^{j\pi n/2},$$

wherein: $l \in \{1, \ldots, v\}$ and v is a number of layers of the PUSCH transmission, $N_1$ and $N_2$ are number of antenna ports with the same polarization in first and second dimensions, respectively, $O_1$ and $O_2$ are oversampling factors in the first and second dimensions, respectively, and S is a scaling factor.

In one embodiment, $(N_1, N_2) = (4,1)$ or $(2,2)$, and $S = \sqrt{2N_1 N_2} = 2\sqrt{2}$.

In one embodiment, $(O_1, O_2) = (1,1), (2,1)$ or $(2,2)$.

In one embodiment, wherein when $(N_1, N_2) = (4,1)$, the UL codebook for 1 layer includes all of or a subset of the following:

$$\frac{1}{S}\begin{bmatrix}1\\1\\1\\1\\1\\1\\1\\1\end{bmatrix}, \frac{1}{S}\begin{bmatrix}1\\1\\1\\1\\j\\j\\j\\j\end{bmatrix}, \frac{1}{S}\begin{bmatrix}1\\1\\1\\1\\-1\\-1\\-1\\-1\end{bmatrix}, \frac{1}{S}\begin{bmatrix}1\\1\\1\\1\\-j\\-j\\-j\\-j\end{bmatrix}, \frac{1}{S}\begin{bmatrix}1\\1\\1\\1\\-j\\-j\\-j\\-j\end{bmatrix}, \frac{1}{S}\begin{bmatrix}1\\j\\-1\\-j\\1\\j\\-1\\-j\end{bmatrix}, \frac{1}{S}\begin{bmatrix}1\\j\\-1\\-j\\j\\-1\\-j\\1\end{bmatrix}, \frac{1}{S}\begin{bmatrix}1\\j\\-1\\-j\\-1\\-j\\1\\j\end{bmatrix}, \frac{1}{S}\begin{bmatrix}1\\j\\-1\\-j\\-j\\1\\j\\-1\end{bmatrix}$$

-continued
$$\frac{1}{S}\begin{bmatrix}1\\-1\\1\\-1\\1\\-1\\1\\-1\end{bmatrix}, \frac{1}{S}\begin{bmatrix}1\\-1\\1\\-1\\j\\j\\-j\\-j\end{bmatrix}, \frac{1}{S}\begin{bmatrix}1\\-1\\-1\\-1\\-1\\1\\1\\1\end{bmatrix}, \frac{1}{S}\begin{bmatrix}1\\-1\\-1\\-1\\-j\\j\\-j\\j\end{bmatrix}, \frac{1}{S}\begin{bmatrix}1\\-j\\-1\\j\\1\\-j\\-1\\j\end{bmatrix}, \frac{1}{S}\begin{bmatrix}1\\-j\\-1\\j\\j\\1\\-j\\-1\end{bmatrix}, \frac{1}{S}\begin{bmatrix}1\\-j\\-1\\j\\-1\\j\\1\\-j\end{bmatrix}, \frac{1}{S}\begin{bmatrix}1\\-j\\-1\\j\\-j\\-1\\j\\1\end{bmatrix}$$

which are determined based on $$v_{l,m} \in \left\{ \begin{bmatrix}1\\1\\1\\1\end{bmatrix}, \begin{bmatrix}1\\j\\-1\\-j\end{bmatrix}, \begin{bmatrix}1\\-1\\1\\-1\end{bmatrix}, \begin{bmatrix}1\\-j\\-1\\j\end{bmatrix} \right\}$$

and $\varphi_n \in \{1, j, -1, -j\}$; and when $(N_1, N_2)=(2,2)$, the UL codebook for 1 layer includes all of or a subset of the following:

$$\frac{1}{S}\begin{bmatrix}1\\1\\1\\1\\1\\1\\1\\1\end{bmatrix}, \frac{1}{S}\begin{bmatrix}1\\1\\1\\1\\j\\j\\j\\j\end{bmatrix}, \frac{1}{S}\begin{bmatrix}1\\1\\1\\1\\-1\\-1\\-1\\-1\end{bmatrix}, \frac{1}{S}\begin{bmatrix}1\\1\\1\\1\\-j\\-j\\-j\\-j\end{bmatrix}, \frac{1}{S}\begin{bmatrix}1\\1\\-1\\-1\\1\\1\\-1\\-1\end{bmatrix}, \frac{1}{S}\begin{bmatrix}1\\1\\-1\\-1\\j\\j\\-j\\-j\end{bmatrix}, \frac{1}{S}\begin{bmatrix}1\\1\\-1\\-1\\-1\\-1\\1\\1\end{bmatrix}, \frac{1}{S}\begin{bmatrix}1\\1\\-1\\-1\\-j\\-j\\j\\j\end{bmatrix}$$

$$\frac{1}{S}\begin{bmatrix}1\\-1\\1\\-1\\1\\-1\\1\\-1\end{bmatrix}, \frac{1}{S}\begin{bmatrix}1\\-1\\1\\-1\\j\\j\\-j\\-j\end{bmatrix}, \frac{1}{S}\begin{bmatrix}1\\-1\\1\\-1\\-1\\1\\-1\\1\end{bmatrix}, \frac{1}{S}\begin{bmatrix}1\\-1\\1\\-1\\-j\\j\\-j\\j\end{bmatrix}, \frac{1}{S}\begin{bmatrix}1\\-1\\-1\\1\\1\\-1\\-1\\1\end{bmatrix}, \frac{1}{S}\begin{bmatrix}1\\-1\\-1\\1\\j\\-j\\-j\\j\end{bmatrix}, \frac{1}{S}\begin{bmatrix}1\\-1\\-1\\1\\-1\\1\\1\\-1\end{bmatrix}, \frac{1}{S}\begin{bmatrix}1\\-1\\-1\\1\\-j\\j\\j\\-j\end{bmatrix}$$

which are determined based on $$v_{l,m} \in \left\{ \begin{bmatrix}1\\1\\1\\1\end{bmatrix}, \begin{bmatrix}1\\1\\-1\\-1\end{bmatrix}, \begin{bmatrix}1\\-1\\1\\-1\end{bmatrix}, \begin{bmatrix}1\\-1\\-1\\1\end{bmatrix} \right\}$$

and $\varphi_n \in \{1, j, -1, -j\}$.

In one embodiment, the UL codebook for 8 antenna ports includes partial coherent (PC) precoding matrices comprising both zero and non-zero entries in each column, the PC precoding matrices are obtained by partitioning the 8 antenna ports into $N_g$ groups, each group comprising $(n_1, n_2)$ antenna ports with the same polarization in the first and second dimensions, respectively, where $(N_g, n_i, n_2)=(2,2,1)$ or $(4,1,1)$, and a layer of the PUSCH transmission is transmitted from k groups, where $1 < k \leq N_g$.

In one embodiment, the UL codebook for 8 antenna ports includes precoding matrices determined based on an UL codebook for $M \in \{2,4\}$ antenna ports, when $M=4$, the indication indicates two precoding matrices ($W_1$ and $W_2$) from the UL codebook for 4 antenna ports, and when $M=2$, the indication indicates four precoding matrices ($W_1 \ldots W_4$) from the UL codebook for 2 antenna ports.

In one embodiment, when $M=4$, the indication indicates a co-phase ($c_{1,l}$) for each layer 1 and the l-th layer of a precoding matrix for 8 antenna ports is given by $$\begin{bmatrix} w_{1,l} \\ c_{1,l} w_{2,l} \end{bmatrix},$$

and when $M=2$, the indication indicates three co-phase values ($c_{1,l}, c_{2,l}, c_{3,l}$) for each layer 1 and the l-th layer of a precoding matrix for 8 antenna ports is given by $$\begin{bmatrix} w_{1,l} \\ c_{1,l} w_{2,l} \\ c_{2,l} w_{3,l} \\ c_{3,l} w_{4,l} \end{bmatrix},$$

where $w_{i,l}$ is the l-th column of $W_1$.

In one embodiment, the UE capability information includes an information whether the UE supports more than 4 layers of the PUSCH transmission. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising
a processor; and
a transceiver operably coupled to the processor, the transceiver configured to:
transmit a UE capability information about an uplink (UL) codebook for 8 antenna ports;
receive an indication indicating a transmit precoding matrix indicator (TPMI) for a transmission of a physical uplink shared channel (PUSCH); and
transmit the PUSCH based on the indicated TPMI,
wherein the TPMI indicates a precoding matrix from the UL codebook for the 8 antenna ports, the UL codebook includes full-coherent (FC) precoding matrices comprising all non-zero entries, and an l-th column of a FC precoding matrix is associated with an l-th layer of the PUSCH transmission, and is given by $$W_{l,m,n}^{(l)} = \frac{1}{S}\begin{bmatrix} v_{l,m} \\ \varphi_n v_{l,m} \end{bmatrix}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

$$\varphi_n = e^{j\pi n/2},$$

wherein:
  $l \in \{1, \ldots, v\}$ and v is a number of layers of the PUSCH transmission,
  $N_1$ and $N_2$ are number of antenna ports with the same polarization in first and second dimensions, respectively,
  $O_1$ and $O_2$ are oversampling factors in the first and second dimensions, respectively, and
  S is a scaling factor.

2. The UE of claim 1, wherein $(N_1, N_2)=(4,1)$ or $(2,2)$, and $S=\sqrt{2N_1N_2}=2\sqrt{2}$.

3. The UE of claim 2, wherein when $(N_1, N_2)=(4,1)$, the UL codebook for 1 layer includes all of or a subset of the following:

$$\frac{1}{S}\begin{bmatrix}1\\1\\1\\1\\1\\1\\1\\1\end{bmatrix},\frac{1}{S}\begin{bmatrix}1\\1\\1\\1\\j\\j\\j\\j\end{bmatrix},\frac{1}{S}\begin{bmatrix}1\\1\\-1\\-1\\1\\1\\-1\\-1\end{bmatrix},\frac{1}{S}\begin{bmatrix}1\\1\\-1\\-1\\j\\j\\-j\\-j\end{bmatrix},\frac{1}{S}\begin{bmatrix}1\\j\\-1\\-j\\1\\j\\-1\\-j\end{bmatrix},\frac{1}{S}\begin{bmatrix}1\\j\\-1\\-j\\j\\-1\\-j\\1\end{bmatrix},\frac{1}{S}\begin{bmatrix}1\\j\\-1\\-j\\-1\\-j\\1\\j\end{bmatrix},\frac{1}{S}\begin{bmatrix}1\\j\\-1\\-j\\-j\\1\\j\\-1\end{bmatrix}$$

$$\frac{1}{S}\begin{bmatrix}1\\-1\\1\\-1\\1\\-1\\1\\-1\end{bmatrix},\frac{1}{S}\begin{bmatrix}1\\-1\\1\\-1\\j\\-j\\j\\-j\end{bmatrix},\frac{1}{S}\begin{bmatrix}1\\-1\\-1\\1\\1\\-1\\-1\\1\end{bmatrix},\frac{1}{S}\begin{bmatrix}1\\-1\\-1\\1\\j\\-j\\-j\\j\end{bmatrix},\frac{1}{S}\begin{bmatrix}1\\-j\\-1\\j\\1\\-j\\-1\\j\end{bmatrix},\frac{1}{S}\begin{bmatrix}1\\-j\\-1\\j\\j\\1\\-j\\-1\end{bmatrix},\frac{1}{S}\begin{bmatrix}1\\-j\\-1\\j\\-1\\j\\1\\-j\end{bmatrix},\frac{1}{S}\begin{bmatrix}1\\-j\\-1\\j\\-j\\-1\\j\\1\end{bmatrix}$$

which are determined based on $$v_{l,m} \in \left\{\begin{bmatrix}1\\1\\1\\1\end{bmatrix},\begin{bmatrix}1\\j\\-1\\-j\end{bmatrix},\begin{bmatrix}1\\-1\\1\\-1\end{bmatrix},\begin{bmatrix}1\\-j\\-1\\j\end{bmatrix}\right\}$$

and $\varphi_n \in \{1, j, -1, -j\}$; and when $(N_1, N_2)=(2,2)$, the UL codebook for 1 layer includes all of or a subset of the following:

$$\frac{1}{S}\begin{bmatrix}1\\1\\1\\1\\1\\1\\1\\1\end{bmatrix},\frac{1}{S}\begin{bmatrix}1\\1\\1\\1\\j\\j\\j\\j\end{bmatrix},\frac{1}{S}\begin{bmatrix}1\\1\\-1\\-1\\1\\1\\-1\\-1\end{bmatrix},\frac{1}{S}\begin{bmatrix}1\\1\\-1\\-1\\j\\j\\-j\\-j\end{bmatrix},\frac{1}{S}\begin{bmatrix}1\\-1\\1\\-1\\1\\-1\\1\\-1\end{bmatrix},\frac{1}{S}\begin{bmatrix}1\\-1\\1\\-1\\j\\-j\\j\\-j\end{bmatrix},\frac{1}{S}\begin{bmatrix}1\\-1\\-1\\1\\1\\-1\\-1\\1\end{bmatrix},\frac{1}{S}\begin{bmatrix}1\\-1\\-1\\1\\j\\-j\\-j\\j\end{bmatrix}$$

$$\frac{1}{S}\begin{bmatrix}1\\-1\\1\\-1\\-1\\1\\-1\\1\end{bmatrix},\frac{1}{S}\begin{bmatrix}1\\-1\\1\\-1\\-j\\j\\-j\\j\end{bmatrix},\frac{1}{S}\begin{bmatrix}1\\1\\-1\\-1\\-1\\-1\\1\\1\end{bmatrix},\frac{1}{S}\begin{bmatrix}1\\1\\-1\\-1\\-j\\-j\\j\\j\end{bmatrix},\frac{1}{S}\begin{bmatrix}1\\-1\\-1\\1\\-1\\1\\1\\-1\end{bmatrix},\frac{1}{S}\begin{bmatrix}1\\-1\\-1\\1\\-j\\j\\j\\-j\end{bmatrix},\frac{1}{S}\begin{bmatrix}1\\1\\1\\1\\-1\\-1\\-1\\-1\end{bmatrix},\frac{1}{S}\begin{bmatrix}1\\1\\1\\1\\-j\\-j\\-j\\-j\end{bmatrix}$$

which are determined based on $$v_{l,m} \in \left\{\begin{bmatrix}1\\1\\1\\1\end{bmatrix},\begin{bmatrix}1\\1\\-1\\-1\end{bmatrix},\begin{bmatrix}1\\-1\\1\\-1\end{bmatrix},\begin{bmatrix}1\\-1\\-1\\1\end{bmatrix}\right\}$$

and $\varphi_n \in \{1, j, -1, -j\}$.

4. The UE of claim 1, wherein: $(O_1, O_2)=(1,1)$, $(2,1)$ or $(2,2)$.

5. The UE of claim 1, wherein:
  the UL codebook for 8 antenna ports includes partial coherent (PC) precoding matrices comprising both zero and non-zero entries in each column,
  the PC precoding matrices are obtained by partitioning the 8 antenna ports into $N_g$ groups, each group comprising $(n_1, n_2)$ antenna ports with the same polarization in the first and second dimensions, respectively, where $(N_g, n_1, n_2)=(2,2,1)$ or $(4,1,1)$, and
  a layer of the PUSCH transmission is transmitted from k groups, where $1 \leq k < N_g$.

6. The UE of claim 1, wherein:
  the UL codebook for 8 antenna ports includes precoding matrices determined based on an UL codebook for $M \in \{2,4\}$ antenna ports,
  when M=4, the indication indicates two precoding matrices ($W_1$ and $W_2$) from the UL codebook for 4 antenna ports, and
  when M=2, the indication indicates four precoding matrices ($W_1 \ldots W_4$) from the UL codebook for 2 antenna ports.

7. The UE of claim 6, wherein:
  when M=4, the indication indicates a co-phase ($c_{1,l}$) for each layer l, and the l-th layer of a precoding matrix for 8 antenna ports is given by $$\begin{bmatrix} w_{1,l} \\ c_{1,l}w_{2,l} \end{bmatrix},$$

and
  when M=2, the indication indicates three co-phase values ($c_{1,l}, c_{2,l}, c_{3,l}$) for each layer l and the l-th layer of a precoding matrix for 8 antenna ports is given by $$\begin{bmatrix} w_{1,l} \\ c_{1,l}w_{2,l} \\ c_{2,l}w_{3,l} \\ c_{3,l}w_{4,l} \end{bmatrix},$$

where $w_{l,1}$ is the l-th column of $W_1$.

8. The UE of claim 1, wherein the UE capability information includes an information whether the UE supports more than 4 layers of the PUSCH transmission.

9. A base station (BS) comprising
  a processor configured to generate an indication indicating a transmit precoding matrix indicator (TPMI) for a transmission of a physical uplink shared channel (PUSCH); and
  a transceiver operably coupled to the processor, the transceiver configured to:
    receive a user equipment (UE) capability information about an uplink (UL) codebook for 8 antenna ports;

transmit the indication indicating the TPMI for the transmission of the PUSCH; and receive the PUSCH based on the indicated TPMI, wherein the TPMI indicates a precoding matrix from the UL codebook for the 8 antenna ports, the UL codebook includes full-coherent (FC) precoding matrices comprising all non-zero entries, and an l-th column of a FC precoding matrix is associated with an l-th layer of the PUSCH transmission, and is given by $$W^{(l)}_{l,m,n} = \frac{1}{S}\begin{bmatrix} v_{l,m} \\ \varphi_n v_{l,m} \end{bmatrix}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$\varphi_n = e^{j\pi n/2},$$

wherein:

$l \in \{1, \ldots, v\}$ and $v$ is a number of layers of the PUSCH transmission, $N_1$ and $N_2$ are number of antenna ports with the same polarization in first and second dimensions, respectively, $O_1$ and $O_2$ are oversampling factors in the first and second dimensions, respectively, and $S$ is a scaling factor.

10. The BS of claim 9, wherein $(N_1, N_2)=(4,1)$ or $(2,2)$, and $S=\sqrt{2N_1 N_2}=2\sqrt{2}$.

11. The BS of claim 10, wherein when $(N_1, N_2)=(4,1)$, the UL codebook for 1 layer includes all of or a subset of the following:

$$\frac{1}{S}\begin{bmatrix}1\\1\\1\\1\\1\\1\\1\\1\end{bmatrix}, \frac{1}{S}\begin{bmatrix}1\\1\\1\\1\\j\\j\\j\\j\end{bmatrix}, \frac{1}{S}\begin{bmatrix}1\\1\\1\\1\\-1\\-1\\-1\\-1\end{bmatrix}, \frac{1}{S}\begin{bmatrix}1\\1\\1\\1\\-j\\-j\\-j\\-j\end{bmatrix}, \frac{1}{S}\begin{bmatrix}1\\j\\-1\\-j\\1\\j\\-1\\-j\end{bmatrix}, \frac{1}{S}\begin{bmatrix}1\\j\\-1\\-j\\j\\-1\\-j\\1\end{bmatrix}, \frac{1}{S}\begin{bmatrix}1\\j\\-1\\-j\\-1\\-j\\1\\j\end{bmatrix}, \frac{1}{S}\begin{bmatrix}1\\j\\-1\\-j\\-j\\1\\j\\-1\end{bmatrix}$$

$$\frac{1}{S}\begin{bmatrix}1\\-1\\1\\-1\\1\\-1\\1\\-1\end{bmatrix}, \frac{1}{S}\begin{bmatrix}1\\-1\\1\\-1\\j\\-j\\j\\-j\end{bmatrix}, \frac{1}{S}\begin{bmatrix}1\\-1\\1\\-1\\-1\\1\\-1\\1\end{bmatrix}, \frac{1}{S}\begin{bmatrix}1\\-1\\1\\-1\\-j\\j\\-j\\j\end{bmatrix}, \frac{1}{S}\begin{bmatrix}1\\-j\\-1\\j\\1\\-j\\-1\\j\end{bmatrix}, \frac{1}{S}\begin{bmatrix}1\\-j\\-1\\j\\j\\1\\-j\\-1\end{bmatrix}, \frac{1}{S}\begin{bmatrix}1\\-j\\-1\\j\\-1\\j\\1\\-j\end{bmatrix}, \frac{1}{S}\begin{bmatrix}1\\-j\\-1\\j\\-j\\-1\\j\\1\end{bmatrix}$$

which are determined based on $$v_{l,m} \in \left\{\begin{bmatrix}1\\1\\1\\1\end{bmatrix}, \begin{bmatrix}1\\j\\-1\\-j\end{bmatrix}, \begin{bmatrix}1\\-1\\1\\-1\end{bmatrix}, \begin{bmatrix}1\\-j\\-1\\j\end{bmatrix}\right\}$$

and $\varphi_n \in \{1, j, -1, -j\}$; and when $(N_1, N_2)=(2,2)$, the UL codebook for 1 layer includes all of or a subset of the following:

$$\frac{1}{S}\begin{bmatrix}1\\1\\1\\1\\1\\1\\1\\1\end{bmatrix}, \frac{1}{S}\begin{bmatrix}1\\1\\1\\1\\1\\1\\1\\1\end{bmatrix}, \frac{1}{S}\begin{bmatrix}1\\1\\1\\1\\-1\\-1\\-1\\-1\end{bmatrix}, \frac{1}{S}\begin{bmatrix}1\\1\\1\\1\\-1\\-1\\-1\\-1\end{bmatrix}, \frac{1}{S}\begin{bmatrix}1\\1\\-1\\-1\\1\\1\\-1\\-1\end{bmatrix}, \frac{1}{S}\begin{bmatrix}1\\1\\-1\\-1\\j\\j\\-j\\-j\end{bmatrix}, \frac{1}{S}\begin{bmatrix}1\\1\\-1\\-1\\-1\\-1\\1\\1\end{bmatrix}, \frac{1}{S}\begin{bmatrix}1\\1\\-1\\-1\\-j\\-j\\j\\-j\end{bmatrix}$$

$$\frac{1}{S}\begin{bmatrix}1\\-1\\1\\-1\\1\\-1\\1\\-1\end{bmatrix}, \frac{1}{S}\begin{bmatrix}1\\-1\\1\\-1\\j\\-j\\j\\-j\end{bmatrix}, \frac{1}{S}\begin{bmatrix}1\\-1\\1\\-1\\-1\\1\\-1\\1\end{bmatrix}, \frac{1}{S}\begin{bmatrix}1\\-1\\1\\-1\\-j\\j\\-j\\j\end{bmatrix}, \frac{1}{S}\begin{bmatrix}1\\-1\\-1\\1\\1\\-1\\-1\\1\end{bmatrix}, \frac{1}{S}\begin{bmatrix}1\\-1\\-1\\1\\j\\-j\\-j\\j\end{bmatrix}, \frac{1}{S}\begin{bmatrix}1\\-1\\-1\\1\\-1\\1\\1\\-1\end{bmatrix}, \frac{1}{S}\begin{bmatrix}1\\-1\\-1\\1\\-j\\j\\j\\-j\end{bmatrix}$$

which are determined based on $$v_{l,m} \in \left\{\begin{bmatrix}1\\1\\1\\1\end{bmatrix}, \begin{bmatrix}1\\1\\-1\\-1\end{bmatrix}, \begin{bmatrix}1\\-1\\1\\-1\end{bmatrix}, \begin{bmatrix}1\\-1\\-1\\1\end{bmatrix}\right\}$$

and $\varphi_n \in \{1, j, -1, -1, -j\}$.

12. The BS of claim 9, wherein: $(O_1, O_2)=(1,1)$, $(2,1)$ or $(2,2)$.

13. The BS of claim 9, wherein:

the UL codebook for 8 antenna ports includes partial coherent (PC) precoding matrices comprising both zero and non-zero entries in each column, the PC precoding matrices are obtained by partitioning the 8 antenna ports into $N_g$ groups, each group comprising $(n_1, n_2)$ antenna ports with the same polarization in the first and second dimensions, respectively, where $(N_g, n_1, n_2)=(2,2,1)$ or $(4,1,1)$, and a layer of the PUSCH transmission is transmitted from k groups, where $1 < k < N_g$.

14. The BS of claim 9, wherein:

the UL codebook for 8 antenna ports includes precoding matrices determined based on an UL codebook for M $\in \{2,4\}$ antenna ports, when M=4, the indication indicates two precoding matrices ($W_1$ and $W_2$) from the UL codebook for 4 antenna ports, and when M=2, the indication indicates four precoding matrices ($W_1 \ldots W_4$) from the UL codebook for 2 antenna ports.

15. The BS of claim 14, wherein:

when M=4, the indication indicates a co-phase ($c_{1,l}$) for each layer l, and the l-th layer of a precoding matrix for 8 antenna ports is given by $$\begin{bmatrix} w_{1,l} \\ c_{1,l} w_{2,l} \end{bmatrix},$$

and when M=2, the indication indicates three co-phase values ($c_{1,l}, c_{2,l}, c_{3,l}$) for each layer l and the l-th layer of a precoding matrix for 8 antenna ports is given by $$\begin{bmatrix} w_{1,l} \\ c_{1,l}w_{2,l} \\ c_{2,l}w_{3,l} \\ c_{3,l}w_{4,l} \end{bmatrix},$$

where $w_{i,l}$ is the l-th column of $W_1$.

16. The BS of claim 9, wherein the UE capability information includes an information whether the UE supports more than 4 layers of the PUSCH transmission.

17. A method for operating a user equipment (UE), the method comprising:
   transmitting a UE capability information about an uplink (UL) codebook for 8 antenna ports;
   receiving an indication indicating a transmit precoding matrix indicator (TPMI) for a transmission of a physical uplink shared channel (PUSCH); and
   transmitting the PUSCH based on the indicated TPMI,
   wherein the TPMI indicates a precoding matrix from the UL codebook for the 8 antenna ports, the UL codebook includes full-coherent (FC) precoding matrices comprising all non-zero entries, and an l-th column of a FC precoding matrix is associated with an l-th layer of the PUSCH transmission, and is given by $$W_{l,m,n}^{(l)} = \frac{1}{S}\begin{bmatrix} v_{l,m} \\ \varphi_n v_{l,m} \end{bmatrix}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

$$\varphi_n = e^{j\pi n/2},$$

wherein:
   $l \in \{1, \ldots, v\}$ and v is a number of layers of the PUSCH transmission,
   $N_1$ and $N_2$ are number of antenna ports with the same polarization in first and second dimensions, respectively,
   $O_1$ and $O_2$ are oversampling factors in the first and second dimensions, respectively, and
   S is a scaling factor.

18. The method of claim 17, wherein $(N_1, N_2)=(4,1)$ or $(2,2)$, and $S=\sqrt{2N_1 N_2}=2\sqrt{2}$.

19. The method of claim 17, wherein: $(O_1, O_2)=(1,1)$, $(2,1)$ or $(2,2)$.

20. The method of claim 17, wherein:
   the UL codebook for 8 antenna ports includes partial coherent (PC) precoding matrices comprising both zero and non-zero entries in each column,
   the PC precoding matrices are obtained by partitioning the 8 antenna ports into $N_g$ groups, each group comprising $(n_1, n_2)$ antenna ports with the same polarization in the first and second dimensions, respectively, where $(N_g, n_1, n_2)=(2,2,1)$ or $(4,1,1)$, and
   a layer of the PUSCH transmission is transmitted from k groups, where $1<k<N_g$.

* * * * *